(12) United States Patent
Ware et al.

(10) Patent No.: US 8,942,309 B1
(45) Date of Patent: Jan. 27, 2015

(54) SIGNAL OUTPUT IMPROVEMENT USING DATA INVERSION AND/OR SWAPPING

(71) Applicant: Rambus Inc., Sunnyvale, CA (US)

(72) Inventors: Frederick A. Ware, Los Altos Hills, CA (US); John Wilson, Wake Forest, NC (US)

(73) Assignee: Rambus Inc., Sunnyvale, CA (US)

( * ) Notice: Subject to any disclaimer, the term of this patent is extended or adjusted under 35 U.S.C. 154(b) by 11 days.

(21) Appl. No.: 13/863,243

(22) Filed: Apr. 15, 2013

Related U.S. Application Data

(60) Provisional application No. 61/643,123, filed on May 4, 2012.

(51) Int. Cl.
*H04L 27/00* (2006.01)
*H04L 25/02* (2006.01)

(52) U.S. Cl.
CPC .................................... *H04L 25/02* (2013.01)
USPC ........... 375/295; 375/219; 375/220; 375/224; 375/316; 365/189.07

(58) Field of Classification Search
CPC ......... G06F 13/28; G06F 13/38; G06F 13/42; G06F 13/4072; H04L 25/4915; H04L 25/02
USPC .......................... 375/219, 220, 224, 295, 316; 365/189.07
See application file for complete search history.

(56) References Cited

U.S. PATENT DOCUMENTS

| 7,411,840 | B2 * | 8/2008 | Gaskins et al. .......... 365/189.07 |
| 7,929,549 | B1 | 4/2011 | Talbot |
| 2008/0048730 | A1 * | 2/2008 | Bae ................................. 327/64 |
| 2008/0225603 | A1 | 9/2008 | Hein |
| 2009/0238300 | A1 | 9/2009 | Hollis |
| 2011/0127990 | A1 | 6/2011 | Wilson et al. |

OTHER PUBLICATIONS

Bae, Seung-Jun et al., "An 80 nm 4 Gb/s/pin 32 bit 512 Mb GDDR4 Graphics DRAM With Low Power and Low Noise Data Bus Inversion," IEEE Journal of Solid-State Circuits, vol. 43, No. 1, Jan. 2008. 11 pages.
Hollis, Timothy M., "Data Bus Inversion in High-Speed Memory Applications," IEEE Transactions on Circuits and Systems—II: Express Briefs, vol. 56, No. 4, Apr. 2009. 5 pages.

* cited by examiner

*Primary Examiner* — Leon Flores
(74) *Attorney, Agent, or Firm* — Fenwick & West LLP

(57) ABSTRACT

An intermediate voltage is maintained between a first voltage and a second voltage by conditionally or selectively performing data bus inversion (DBI) and/or data swap operations on a first and second transmit channel. The operations are performed to, in some instances, create a current imbalance between the first and second channel where the intermediate voltage drifts toward a target range or target value between the first voltage and second voltage in response to the created imbalance.

39 Claims, 13 Drawing Sheets

FIG. 3

SIGNAL OUTPUT IMPROVEMENT USING DATA INVERSION AND/OR SWAPPING

CROSS-REFERENCE TO RELATED APPLICATIONS

This application claims priority to U.S. Provisional Patent Application No. 61/643,123, filed May 4, 2012, and entitled "SIGNAL OUTPUT IMPROVEMENT USING DATA INVERSION AND/OR SWAPPING," which is hereby incorporated by reference in its entirety.

BACKGROUND

In data communication systems, data is often transmitted as binary information in the form of bits, where a relatively high voltage represents a bit having a logic value 1 and a relatively low voltage represents a bit having a logic value 0 (or vice versa). To increase throughput, multiple bits may be transmitted in parallel over one or more data buses or channels, each channel having several sub-channels. For example, a data channel may include eight sub-channels to transmit eight bits during a given bit time.

In AC-signaling systems, the number of sub-channel bit transitions, i.e., where some sub-channel bits transition at the start of a new bit time between high and low voltages on a given channel, is directly proportional to the amount of supply current drawn by that channel. As such, signal streams with a smaller average number of bit transitions per bit time draw lower supply current and signal streams with a larger average number of bit transitions per bit time draw higher supply current. Current fluctuations due to variations in bit patterns can cause noise within the system and are somewhat mitigated using data bus inversion (DBI), where an inverse operation is conditionally applied to the parallel bits on a data channel to reduce the average number of bit transitions per bit time as well as the range of the number of bit transitions per bit time, and an additional signal line is used to signal whether DBI is on or off at each bit time.

BRIEF DESCRIPTION OF THE DRAWINGS

For a more complete understanding of the concepts described herein, reference is now made to the following descriptions taken in conjunction with the accompanying drawings, in which:

FIG. 3 is a table illustrating certain aspects of an embodiment;

DETAILED DESCRIPTION OF THE INVENTION

To minimize power consumption, a communication system may operate its transmitters in half-swing mode, effectively reducing the amplitude of the voltage waveform used to transmit the bits by half, and therefore, reducing the average power consumed per bit lane by a factor of four. To further reduce power consumption, the system transmitters may be stacked to operate in half-swing mode, where a first set of bit lane transmitters for one of a plurality of parallel channels are coupled between a high voltage and an intermediate voltage and a second set of bit lane transmitters for another one of the plurality of parallel channels are coupled between the intermediate voltage and a low voltage. In that case, transmitters across the entire system simultaneously share the single intermediate voltage as a single, overhead voltage signal. Ideally, the intermediate voltage should be maintained at or near the midpoint between the high voltage and the low voltage. Where a disparate number of bit transitions occur between the first and second sets of bit lane transmitters, however, a current imbalance develops between the first and second sets of bit lane transmitters. This current imbalance causes the intermediate voltage to drift toward the voltage supply on the channel having the highest number of bit transitions during that time. Any drift results in an unbalanced output signal because the midpoints of the bit transitions drift away from their comparison points. Therefore, to be most effective, the intermediate voltage should be maintained at or near the midpoint of the high and low voltages. The use of an intermediate voltage source can help hold the intermediate voltage steady, but this approach adds system expense and negates part of the power reduction advantage of the stacked design.

Figure 1:
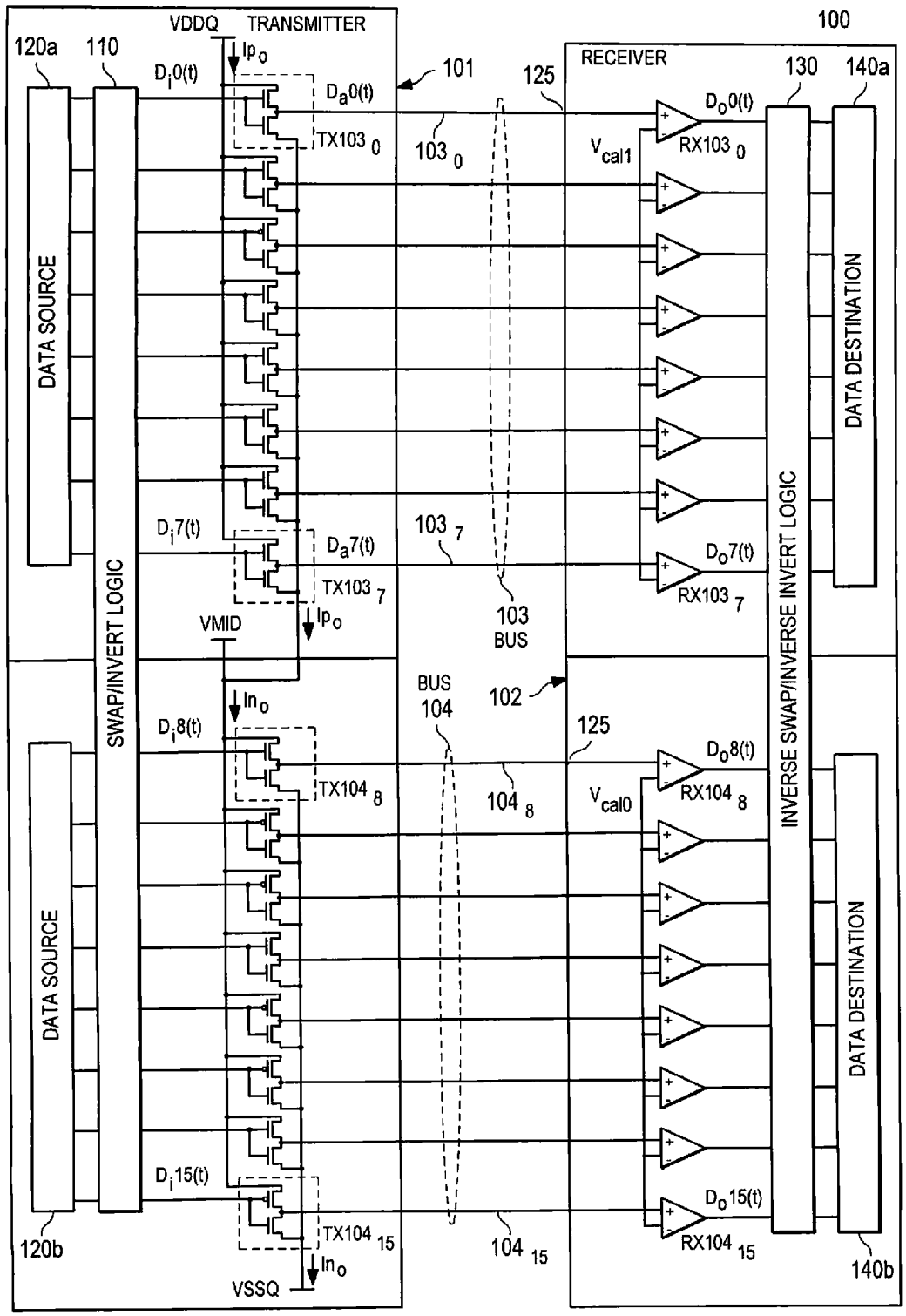
FIG. 1 depicts an embodiment of a communication system in which concepts described herein are applied.

FIG. 1 depicts a communication system 100 including a transmitter 101 and a receiver 102. Transmitter 101 may, for example, be located in a memory device, memory controller, buffer circuit, or other part of a memory system or other bused system that conveys data, addresses, and/or commands and includes or is in communication with one or more data sources 120a/b. Two data sources 120a/b can provide parallel data streams $D_i0(t)$-$D_i15(t)$, and may include, e.g., a serial-to-parallel converter, multiplexing logic, and the like. Receiver 102 can also be located in similar devices as those identified above for the transmitter, but for the transaction described is the target of the transmitter and is thus in a peered device. Receiver 102 recovers output data $D_o0(t)$-$D_o15(t)$ and can include or be in communication with two data destinations 140a/b. Data destinations 140a/b can include demultiplexing logic and other necessary logic to recover and use the data. As will be discussed in greater detail, transmitter 101 includes or is in communication with swap/invert logic 110 and receiver 102 includes or is in communication with inverse swap/inverse invert logic 130. Each of logic 110 and 130 enable solutions for maintaining a midpoint voltage between high and low voltage nodes in communication system 100, providing improved output signals ultimately received by data destinations 140a/b from data sources 120a/b. While FIG. 1 depicts a source-terminated system, it should be appreciated that the concepts discussed herein apply to both source-terminated and receiver-terminated communication systems.

Transmitter 101 includes a first group of transmitters $TX103_{(0)}$-$TX103_{(7)}$ that convey eight discrete signals, bit streams $D_i0(t)$-$D_i7(t)$, as parallel, continuous-time signals $D_a0(t)$-$D_a7(t)$, to receiver 102 via eight bit lane sub-channels $103_{(0)}$-$103_{(7)}$. Together, sub-channels $103_{(0)}$-$103_{(7)}$ comprise a first parallel data channel or bus 103. Also, transmitter 101 includes a second group of transmitters $TX104_{(8)}$-$TX104_{(15)}$ that convey eight discrete signals, bit streams $D_i8(t)$-$D_i15(t)$, as parallel, continuous-time signals $D_a8(t)$-$D_a15(t)$ to receiver 102 via eight bit lane sub-channels $104_{(8)}$-$104_{(15)}$. Together, sub-channels $104_{(8)}$-$104_{(15)}$ comprise a second parallel data channel or bus 104. Sixteen sub-channels are shown connected between transmitter 101 and receiver 102; however, as will be discussed, system 100 can support more or fewer sub-channels and/or channels according to other embodiments.

According to FIG. 1, system 100 is a stacked system, where the first group of transmitters, $TX103_{(0)}$-$TX103_{(7)}$, is coupled between a voltage node supplying a high voltage, VDDQ, and a voltage node supplying an intermediate voltage, VMID, and the second group of transmitters, $TX104_{(8)}$-$TX104_{(15)}$, is coupled between the intermediate voltage node and a voltage node supplying a low voltage, VSSQ. Transmitters $TX103_{(0)}$-$TX103_{(7)}$ and $TX104_{(8)}$-$TX104_{(15)}$ can comprise transistors that, according to some configurations, are driven by pre-drivers (not shown) according to received enable signals and can be off (non-conducting) or on (conducting) in response to the state of a respective one of signals Di[0:15](t). In at least one embodiment, transmitters $TX103_{(0)}$-$TX103_{(7)}$ can be implemented using PMOS transistors through which current passes when their respective control terminals are presented with relatively low voltages, and transmitters $TX104_{(8)}$ $TX104_{(15)}$ can be implemented using NMOS transistors through which current passes when their respective control terminals are presented with relatively high voltages.

According to the illustrated embodiment, each transmitter, $TX103_{(0)}$-$TX103_{(7)}$ and $TX104_{(8)}$-$TX104_{(15)}$, includes a pull-up driver and a pull-down driver that transfer the data streams onto each respective sub-channel according to signals received from respective data sources 120a/b. Specifically, first transmitters $TX103_{(0)}$-$TX103_{(7)}$ each include a pull-up driver having a control terminal receiving a data signal stream from data source 120a, a first current-handling terminal coupled to a relatively high voltage level from voltage node VDDQ, and a second current-handling terminal providing a version of the signal stream as a continuous-time output signal. Each pull-down driver also includes a control terminal receiving a data signal stream from data source 120a, a first current-handling terminal coupled to a relatively low voltage level from voltage node VMID, and a second current-handling terminal coupled to the second current-handling terminal of the corresponding pull-up driver. Second transmitters $TX104_{(8)}$-$TX104_{(15)}$ are similarly configured, where each include a pull-up driver having a control terminal receiving a data signal stream from data source 120b, a first current-handling terminal coupled to a relatively high voltage level from voltage node VMID, and a second current-handling terminal providing a version of the signal stream as a continuous-time output signal. Each pull-down amplifier also includes a control terminal receiving a data signal stream from data source 120b, a first current-handling terminal coupled to a relatively low voltage level from voltage node VSSQ, and a second current-handling terminal coupled to the second current-handling terminal of the corresponding pull-up driver.

For each sub-channel, the pull-up driver can be used to drive a logic 1 over the sub-channel when driven and the pull-down driver can be used to drive a logic 0 over the same link when driven. Pull up currents, $I_{p1}$ (on selected sub-channels of bus 103) and $I_{n1}$ (on selected sub-channels of bus 104), flow toward receiver 102 to charge the respective bit lanes and signal logic 1 on the desired sub-channels. Pull down currents $I_{p2}$ (on selected sub-channels of bus 103) and $I_{n2}$ (on selected sub-channels of bus 104), flow away from receiver 102 to discharge the respective bit lanes and signal logic 0 on the desired sub-channels. Each transmit amplifier is assumed to draw approximately the same maximum current, I. Therefore, the magnitude of currents $I_{p1}$ and $I_{n1}$ peak at 8I, respectively, when all pull-up drivers are on, and the magnitude of currents $I_{p2}$ and $I_{n2}$ peak at 8I, respectively when all pull-down drivers are on.

Signal reflections on the sub-channels can limit performance of communication systems. As such, system 100 can be configured according to different termination schemes for each sub-channel to reduce such reflections on the sub-channels. Transmit-side termination can be implemented in single-ended, AC-driven systems by matching the transmitter impedance to the characteristic impedance of the sub-channel itself. This type of termination exists in the system illustrated at FIG. 1 as described above. In that case, the sub-channel is not terminated (or is significantly unmatched) at the receiver. Signal reflections from the respective receiver on each sub-channel will be dampened upon return to the originating transmitter. As an alternative, receive-side termination can be implemented in a DC-driven system to improve signal integrity and speed, usually at the cost of higher power consumption. In that case, a termination resistor at the receive end of each sub-channel is used to match the impedance of the sub-channel at the termination, absorbing the wavefront at the receiver. That is, a termination resistor can be selected to match the trace impedance and is taken to VMID to eliminate signal reflections.

The embodiment depicted in FIG. 1 is a stacked, single-ended system operating in half-swing mode. As such, the transmitters on data channel 103 use one half of the available voltage range to transmit data on sub-channels $103_{(0)}$-$103_{(7)}$, i.e., the voltage range between VDDQ and VMID, whereas transmitters on data channel 104 use the other half of the available voltage range to transmit data on sub-channels $104_{(8)}$-$104_{(15)}$, i.e., the voltage range between VMID and VSSQ. In the illustrated embodiment, VMID is a single intermediate voltage supply shared across all transmitters. In contrast, a system operating in full swing mode operates such that all transmitters in the system use the entire voltage range, i.e., between VDDQ and VSSQ. In half-swing mode, the voltage signal is ½ the magnitude of the same symbol transition in full swing mode. Therefore, the voltage swing on each data channel and the points at which a bit on each channel transitions between binary states are separated by half as much voltage, which reduces power consumed by the system.

To further enable half-swing mode operation, receiver 102 comprises eight receive amplifiers $RX103_{(0)}$-$RX103_{(7)}$ connected to respective sub-channels $103_{(0)}$-$103_{(7)}$ and eight receive amplifiers $RX104_{(8)}$-$RX104_{(15)}$ connected to respective sub-channels $104_{(8)}$-$104_{(15)}$, where each receiver amplifier includes a data node, coupled to a respective data terminal 125 for receiving data over its respective sub-channel, and a reference node. Receiver amplifiers $RX103_{(0)}$-$RX103_{(7)}$ include a reference node coupled to a first reference voltage node, $V_{(cal\ 1)}$, which has a value approximately midway between VDDQ and VMID, and receiver amplifiers $RX104_{(8)}$-$RX104_{(15)}$ include a reference node coupled to a second reference voltage node, $V_{(cal\ 0)}$, having a value approximately midway between VMID and VSSQ.

With reference to FIGS. 2A-2D, to most effectively operate in half-swing mode, communication system 100 maintains intermediate reference voltage, VMID, supplied at a like-named node, about a midpoint between the high voltage, VDDQ, supplied at a like-named node and the low voltage, VSSQ, also supplied at a like-named node. In this embodiment, VMID 202 is a midpoint voltage that could be generated (in the absence of signaling on the channels) by a linear regulator or equivalent, where VMID 202 ideally supplies (or sinks) the time-averaged difference in current used by the two sets of transmitters on channel 103 and channel 104. However, VMID 202 can also be generated by other means in other embodiments, including methods that supply only weak regulation of voltage VMID. Many methods of establishing and maintaining appropriate reference voltages are well known to those of skill in the art and are therefore omitted for brevity.

Figure 2A:
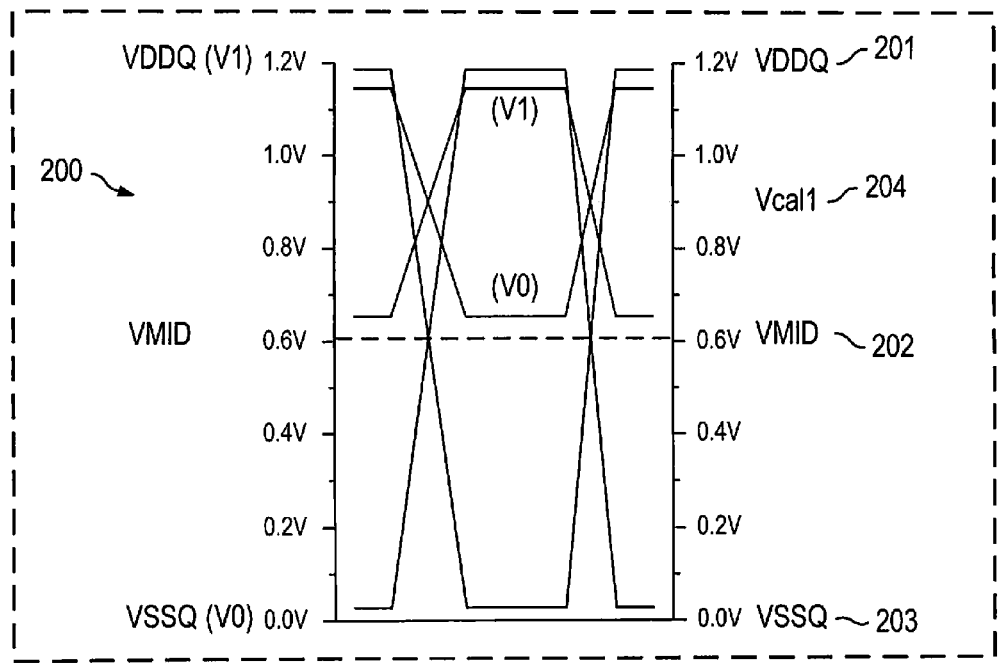
FIG. 2A is a waveform diagram depicting a continuous-time data stream from a transmitter operating in half-swing mode and transmitting bits using a voltage waveform between a high voltage supply and an intermediate voltage supply, as received at an unterminated receiver.
Figure 2B:
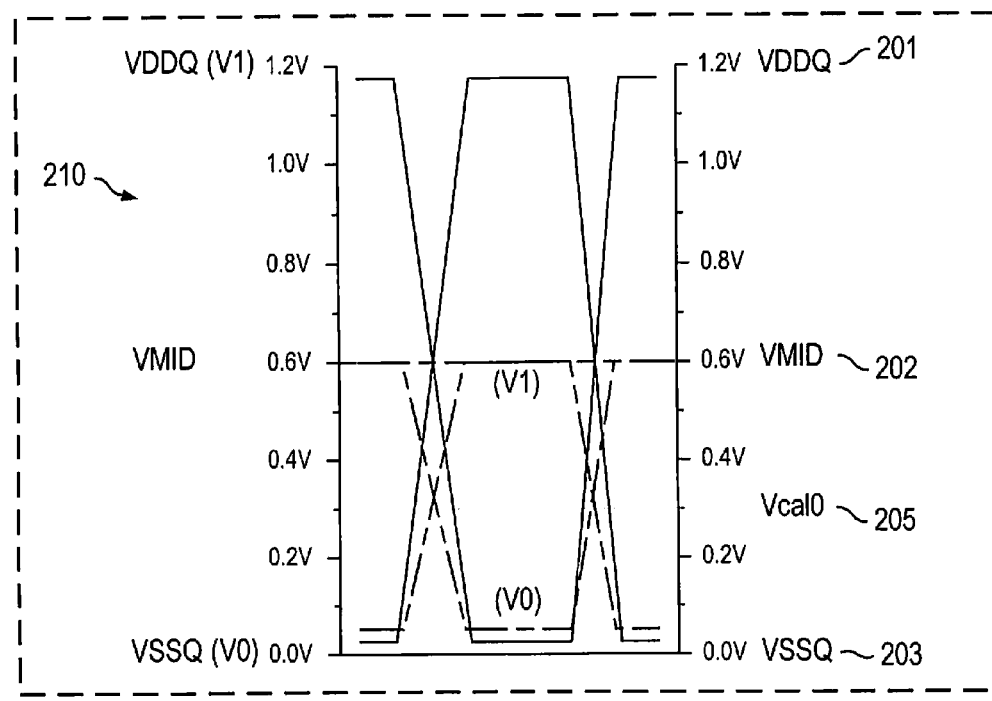
FIG. 2B is a waveform diagram depicting a continuous-time data stream from a transmitter operating in half-swing mode and transmitting bits using a voltage waveform between an intermediate voltage supply and a low voltage supply, as received at an unterminated receiver.
Figure 2C:
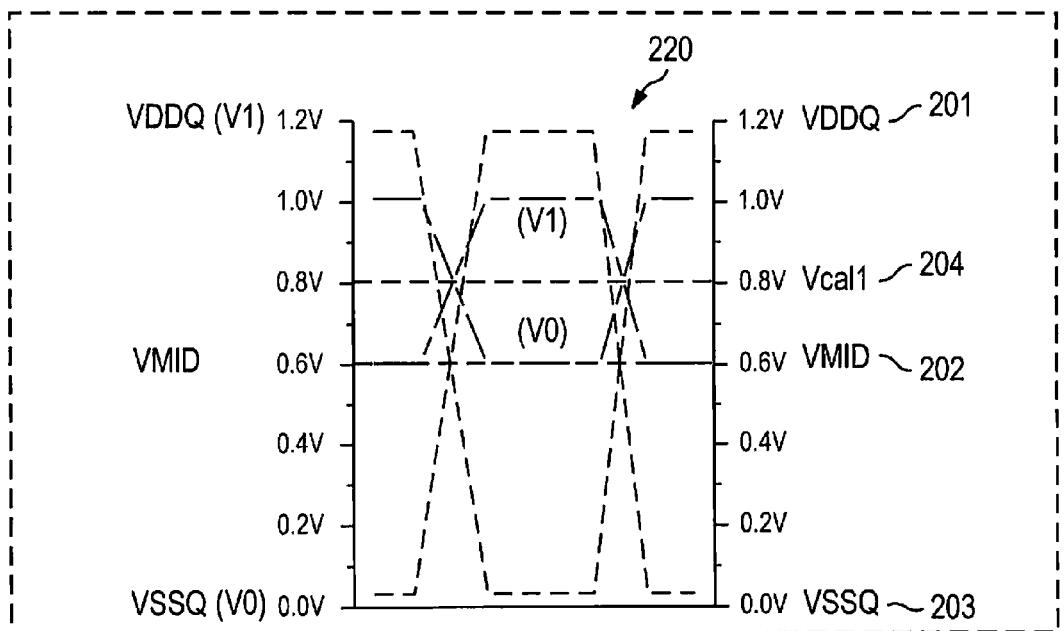
FIG. 2C is a waveform diagram depicting a continuous-time data stream from a transmitter operating in half-swing mode and transmitting bits using a voltage waveform between a high voltage supply and an intermediate voltage supply, as received at a terminated receiver.
Figure 2D:
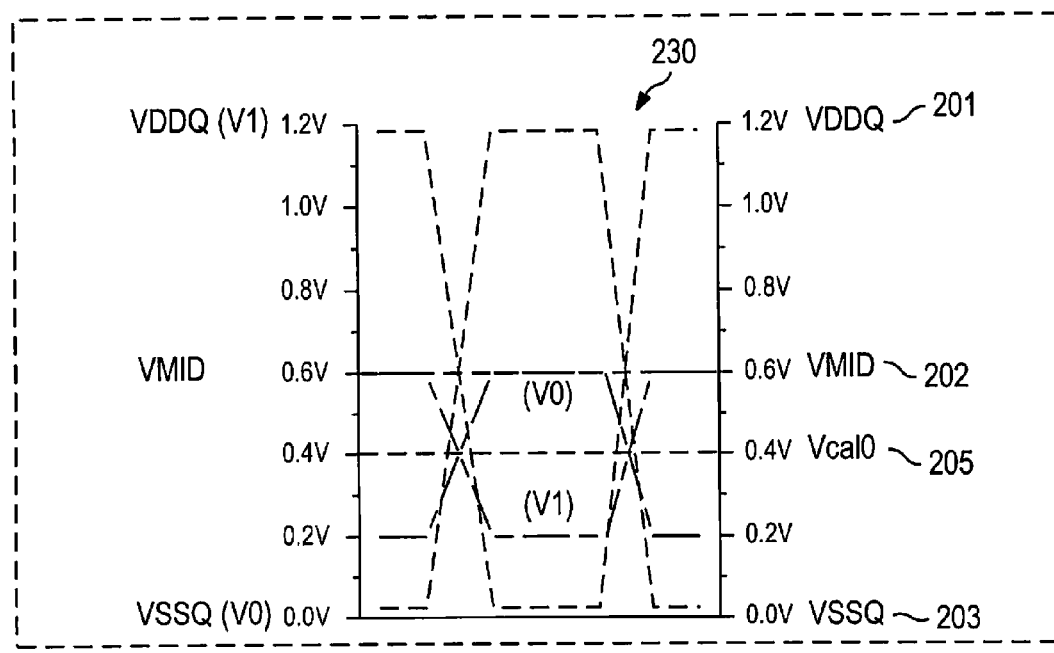
FIG. 2D is a waveform diagram depicting a continuous-time data stream from a transmitter operating in half-swing mode and transmitting bits using a voltage waveform between an intermediate voltage supply and a low voltage supply, as received at a terminated receiver.

FIG. 2A is a waveform diagram 200 depicting a noise-free and jitter-free data eye for a transmitter operating in half-swing mode in a source-terminated system and transmitting bits using a voltage waveform between a high voltage supply VDDQ 201 and an intermediate voltage supply VMID 202. FIG. 2B is a waveform diagram 210 depicting a noise-free and jitter-free data eye for a transmitter operating in half-swing mode in a source-terminated system and transmitting bits using a voltage waveform between intermediate voltage supply VMID 202 and a low voltage supply VSSQ 203. FIG. 2C is a waveform diagram 220 depicting a noise-free and jitter-free data eye for a transmitter operating in half-swing mode in a receiver-terminated system and transmitting bits using a voltage waveform between high voltage supply VDDQ 201 and intermediate voltage supply VMID 202. FIG. 2D is a waveform diagram 230 depicting a noise-free and jitter-free data eye for a transmitter operating in half-swing mode in a receiver-terminated system and transmitting bits using a voltage waveform between intermediate voltage supply VMID 202 and a low voltage supply VSSQ 203. Referring to FIGS. 2A-2D, $V_{(cal\ 1)}$ 204 and $V_{(cal\ 0)}$ 205 are comparison reference voltages that can be generated internally by a receiver component, e.g., receiver 102, with a resistor/divider circuit or similar circuit. Specifically, $V_{(cal\ 1)}$ 204 is derived from VDDQ 201/VREF 202 and $V_{(cal\ 0)}$ 205 is derived from VMID 202/VSSQ 203. $V_{(cal\ 1)}$ 204 and $V_{(cal\ 0)}$ 205 may also be sourced externally from, e.g., transmitter 101. For example, $V_{(cal\ 1)}$ 204 and $V_{(cal\ 0)}$ 205 may be calibrated during power-up using test patterns.

As discussed, transmitter 101 conveys data to receiver 102 on each bit lane as bit patterns, each expressed as a voltage signal that transitions (as required by the data) between relatively high and relatively low voltage levels between a first bit time and a second bit time. Receiver 102 recovers the bit patterns, and therefore the original data, by comparing the voltage signals on each channel near the center of each bit time against a reference voltage to distinguish between the high and low voltage levels during each bit time. These reference voltages are $V_{(cal\ 1)}$ 204 for bits transmitted on data channel 103 and $V_{(cal\ 0)}$ 205 for bits transmitted on data channel 104. Adjacent like-symbols are represented by maintaining the same voltage over multiple bit times, whereas adjacent dissimilar symbols are represented by transitioning between voltage levels between bit times. Transmitter 101 draws current from a voltage source, e.g., VDDQ, to express voltage levels and to transition between them. In communication system 100, which expresses data as parallel source-terminated signals, most supply current is drawn during the bit transitions. As such, bit patterns with fewer bit transitions tend to draw lower supply current and bit patterns with more bit transitions tend to draw higher supply current. Therefore, supply current over time varies with the transmitted bit pattern, and more specifically with the number of transitions in that pattern being communicated.

Disparate magnitudes and fluctuations in supply current drawn by data channel 103 and data channel 104, i.e., between VDDQ and VMID and VMID and VSSQ, respectively, tend to induce drift in VMID. The supply current flowing into the VMID node from the upper drivers and out of the VMID node to the lower drivers will often not be equal, such that a current imbalance exists that will pull VMID away from its ideal position if left uncorrected. In low power systems that typically operate with less voltage margin, a current imbalance on either side of node VMID, and a resulting drift in the same, is even more critical than in higher power systems. Undue drift in VMID causes a reduction in voltage margin at the receiver and can lead to bit errors. One method to help maintain current balance couples a capacitor to the VMID node so that charge can be stored and/or discharged at the VMID node as needed to reduce short-term voltage fluctuations. In that case, the value of VMID is maintained about a value of (VDDQ+VSSQ)/2 by supplying or drawing current from a capacitor coupled to the VMID voltage node.

Unfortunately, in parallel data communication systems such as system 100, simultaneously transmitting and recovering multiple bits exacerbates the problems of data-dependent supply noise because supply current needs can vary dramatically between bit times. In the case of system 100, in each of first data channel 103 and second data channel 104, from zero to eight bits might change values from one bit time to the next. The resulting problem is referred to by those of skill in the art as simultaneous switching noise, or SSN. Such instability can introduce significant errors in supply and reference voltages, and thus adversely impact performance. For example, these variations can have a detrimental effect on VMID, causing noise that affects output signal integrity. A relatively complex power supply may be required to adequately regulate VMID in prior art systems.

A coding scheme referred to as Data Bus Inversion (DBI) has been implemented in parallel communication systems to minimize SSN. In an eight-bit example, a system employing DBI uses an extra sub-channel to convey a ninth bit, or DBI bit, that when asserted signifies that the other eight bits on the channel are inverted (when inverted a low value represents a 1 and a high value represents a 0, if the normal convention is the opposite). AC-DBI logic toggles the DBI bit at each new bit time, unless by doing so the number of transitions would equal five or more—in that case, DBI is not toggled and the other eight bit lanes are inverted. This method guarantees that no more than four transitions will appear on the nine sub-channels at the start of each bit time. In a stacked communication system such as system 100, having transmitters stacked above a reference voltage comprising a first data channel and transmitters stacked below the reference voltage comprising a second voltage, DBI can be implemented separately on each stack of transmitters. Doing so tends to reduce SSN on each bus or channel, and therefore, the system. However, this scheme would not necessarily operate to maintain the midpoint reference voltage within a target range between the high and low voltages, or much less correct the situation where the midpoint reference voltage drifts beyond that target range.

With the above in mind, system 100 deliberately alters supply current patterns on the upper and lower drivers, considered as a group, to help maintain VMID within a target range. In a preferred embodiment, the target range is centered about the midpoint between VDDQ and VSSQ. To that end, a non-intuitive use of DBI is implemented in communication system 100 so that VMID is 1) maintained at or near a target value or within a range between the voltage supplies, e.g., VDDQ and VSSQ, or 2) moved toward the range when VMID drifts beyond the range. This implementation may involve deliberately creating or even maximizing an imbalance in current supplies between first data channel 103 and second data channel 104 for one or more bit times to restore the reference voltage to a range between the high voltage and the low voltage. Further, in conjunction with, or as an alternative to, the non-intuitive use of DBI mentioned above, data may be swapped between the first data channel and second data channel between bit times. This selective or conditional application of DBI and/or swapping data to control the number of bit transitions occurring over multiple data buses offers at least a second-order solution, and preferably a primary solution, to correct an imbalanced intermediate voltage in a stacked transmit/receive communication system.

Figure 3:
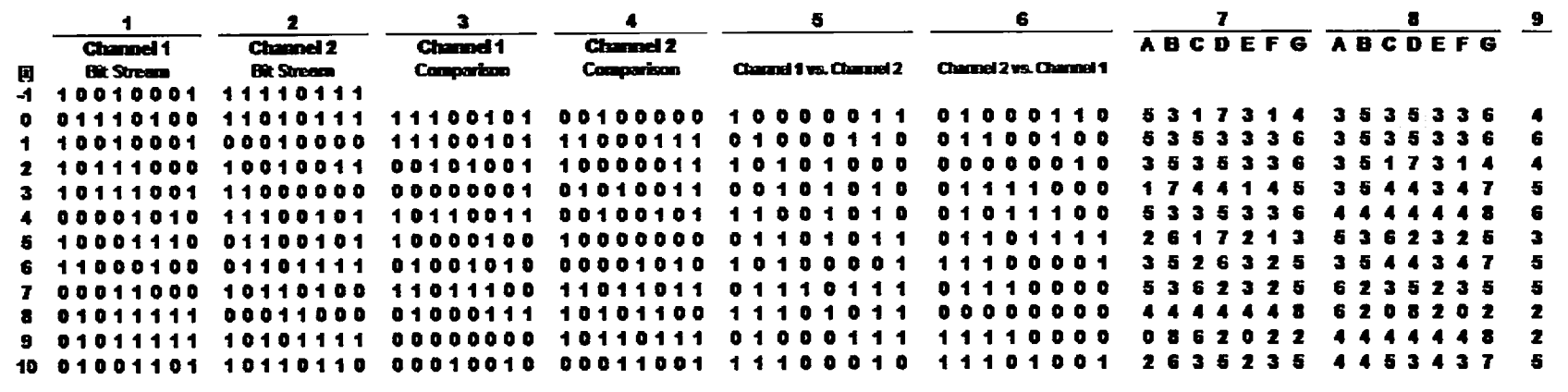

An implementation of this solution is explained in greater detail with reference to the table illustrated at FIG. 3. Referring to FIG. 3, column 1 is a representation of the bit streams to be communicated between a data source and data destination, e.g., source 120a and destination 140a, over bit times i, where i=−1, 0, 1, 2, 3, . . . , n, and column 2 is a representation of the bit streams to be communicated between another data source and destination, e.g., source 120b and destination 140b, over bit times i, where again, i=−1, 0, 1, 2, 3, . . . , n. The binary state of each bit is shown for each bit time, i, under columns 1 and 2, respectively. According to FIG. 3, each source channel comprises eight sub-channels, $1_{A-H}$ from source 120a and $2_{A-H}$ from source 120b, where a single bit is present on each sub-channel. While FIG. 3 represents bits to be communicated from two 8-bit data source channels, the concepts described herein apply to data communication using different numbers of data buses and/or sub-channels.

Column $3_{A-H}$ each represent a respective comparison of the binary state of each bit present on a first respective source sub-channel at bit time (i−1) and bit time (i). Column $4_{A-H}$ each represent a respective comparison of the binary state of each bit present on a second respective source sub-channel at bit time (i−1) and bit time (i). A "1" for a sub-channel comparison indicates that the compared bits are different, and a "0" indicates that the compared bits are the same. According to columns 3 and 4, the comparisons are performed for bits that are not swapped between the first data channel and the second data channel between bit time (i−1) and bit time (i).

Column $5_{A-H}$ each represent a respective comparison of the binary state of each bit present on a first respective source sub-channel at bit time (i) and the binary state of each corresponding bit present on a second respective source sub-channel at bit time (i−1). Column $6_{A-H}$ each represent a respective comparison of the binary state of each bit present on a second respective source sub-channel at bit time (i) and the binary state of each corresponding bit present on a first respective source sub-channel at bit time (i−1). A "1" for a sub-channel comparison indicates that the compared bits are different, and a "0" indicates that the compared bits are the same. According to columns 5 and 6, the comparisons are performed for bits as if the bits were swapped between the first data channel and the second data channel between bit time (i−1) and bit time (i).

Referring again to FIG. 3, column 7 includes a number of sub-columns, 7A-7G, and includes data as described below from the case where bits are not swapped between the source channels between consecutive bit times. Column 8 also includes a number of sub-columns, 8A-8G, and includes data as described below from the case where bits are swapped between the source channels between consecutive bit times. Column 9 includes information that represents the achievable minimum number of bit transitions after considering the potential operations described in columns 7 and 8.

As discussed above, in some systems the amount of supply current drawn by transmitters on each data channel is largely proportional to the number of bits that change binary states over time. Average supply current drawn by each channel thus varies with the data pattern being communicated by that bus or channel. Where a disparate number of bit transitions occur on the first and second data channel between bit times, a current imbalance develops. The resulting current imbalance on either side of the reference voltage tends to cause a drift in the reference voltage.

As also discussed above, DBI could be applied to minimize the number of bit transitions between successive bit times on each of the upper and lower channels. While this application of DBI may effectively lower the amount of supply current drawn by each data bus or channel in a stacked system, DBI will not necessarily correct a wayward intermediate voltage between high and low voltage sources. Additional power still must be applied at the midpoint between two stacks to correct any undesired imbalances.

The concepts utilized to maintain an intermediate voltage about a target value or target range according to an embodiment are discussed in more detail below. Reference to columns 7 and 8 provides explanation of the interplay between concepts that can be used alternately or in combination to maintain an intermediate voltage about a target point or a target range. Referring first to column 7, sub-column 7A tallies the number of bit transitions that occur on a first data bus, e.g., data channel 103, between bit times (i−1) and (i) in the event DBI is not applied at bit time (i) on that channel, sub-column 7B tallies the number of bit transitions that occur on the first data channel between bit times (i−1) and (i) in the event DBI is applied at bit time (i) on that channel, sub-column 7C tallies the number of bit transitions that occur on a second data bus, e.g., data channel 104, between bit times (i−1) and (i) in the event DBI is not applied at bit time (i) on that channel, and sub-column 7D tallies the number of bit transitions that occur on a second data bus, e.g., data channel 104, between bit times (i−1) and (i) in the event DBI is applied at bit time (i) on that channel. Sub-column 7E indicates the minimum number of bit transitions that can be achieved on the first data channel between bit times (i−1) and (i) (the minimum of column entries 7A and 7B on the same row), and column 7F indicates the minimum number of bit transitions that can be achieved on the second data channel between bit times (i−1) and (i) (the minimum of column entries 7C and 7D on the same row). Sub-columns 7E and 7F include the inverted and non-inverted options that may be selected between to obtain a minimum transition count. Finally, sub-column 7G sums column entries 7E and 7F in the same row to illustrate the minimum sum of bit transitions achievable by selectively applying DBI on the first and/or second data buses at bit time (i). As can be seen, in some instances the minimum number of total bit transitions will be achieved by applying DBI on both, one of, or neither of the first and second data bus, depending on the bit times being compared. It is noted that in an actual system, what would be compared is what was actually transmitted at the previous bit time-thus the same numbers shown in FIG. 3 for "DBI on" at a given bit time would be achieved by "DBI off" in the system if, for the previous bit time, what was actually transmitted was "DBI on." Further, the tallies and sums shown in column 7 do not indicate any bit transitions attributable to switching of the DBI signal itself, although such can be taken into account as well in a given embodiment to determine the most appropriate application of DBI for a given bit time.

The information included in column 8 and its sub-columns generally corresponds to the information included in column 7 and its sub-columns, but with the additional feature that data sources are swapped between the first data channel and the second data channel between bit times (i−1) and (i). As such, sub-column 8A tallies the number of bit transitions that occur when the binary state of each bit received on the second source channel at bit time (i−1) and the binary state of each bit received on the first source channel at bit time (i) are transmitted on the same data channel at bit times (i−1) and (i), respectively, and DBI is not applied at bit time (i) on that channel, sub-column 8B tallies the number of bit transitions that occur when the binary state of each bit received on the second source channel at bit time (i−1) and the binary state of each bit received on the first source channel at bit time (i) are transmitted on the same data channel at bit times (i−1) and (i), respectively, and DBI is applied at bit time (i) on that channel, sub-column 8C tallies the number of bit transitions that occur when the binary state of each bit received on the first source channel at bit time (i−1) and the binary state of each bit received on the second source channel at bit time (i) are transmitted on the same data channel at bit times (i−1) and (i), respectively, and DBI is not applied at bit time (i) on that channel, and sub-column 8D tallies the number of bit transitions that occur when the binary state of each bit received on the first source channel at bit time (i−1) and the binary state of each bit received on the second source channel at bit time (i−1) are transmitted on the same data channel at bit times (i−1) and (i), respectively, and DBI is applied at bit time (i) on that channel. Sub-columns 8E and 8F indicate the minimum number of bit transitions that can be achieved when swapping data between the first data channel and second data channel as described above in the two respective cases, and for each swapped channel selecting the case where DBI is applied or not applied at bit time (i) to achieve the minimum number of bit transitions. Finally, sub-column 8G sums column entries 8E and 8F in the same row to illustrate the minimum sum achievable by selectively applying DBI on the first and/or second data channel at bit time (i) while swapping data between the first data channel and second data channel as described above.

The inversion and swapping techniques can be implemented by including additional bit lanes that dictate the state of the inversion and swap operations. In the example above, a ninth bit lane can be added on each data channel that defines when inversion would apply on that channel, e.g., where a bit transition on the ninth bit lane signifies an inversion operation occurring on that channel. Additionally, a tenth bit lane can be added on one channel that defines when a swap operation would apply between the channels, e.g., where a bit transition on the tenth bit lane signifies the swapping operation occurring between channels since the previous bit time. These additional "inversion" and "swap" bits can also be transmitted on separate sub-channels, apart from the stacked data channels themselves, between transmitter and receiver. The circuitry described above can be used to transmit the inversion and swap bits between, e.g., transmitter 101 and receiver 102, to code data from data sources 120a and 120b and then decode the data prior to data destinations 140a and 140b.

Over time, selectively utilizing DBI and/or swapping operations as described above can be expected to reduce the number of bit transitions for the communication system, as compared to non-DBI and/or non-swapping communication systems. By computing the equivalent of the data presented in FIG. 3, and then selectively applying DBI to independently minimize bit transitions over time on the two channels, the expected average bit transition count drops from 8.0 transitions/interval when DBI is never applied or always applied to 6.54 transitions/interval, after accounting for transitions on the DBI lanes. Further, selectively applying the swapping operation on an additional bit lane can reduce the expected average bit transition count across 19 bit lanes to 6.24 transitions/interval, after accounting for transitions on the DBI lanes and swap lane. The roughly 5% decrease in average transitions/interval by adding a swap channel may, in some cases, not be enough to justify its addition, but is also desirable for the additional functionality enabled by the swap channel, as will now be described.

An exemplary implementation of the concepts is described with further reference to the table illustrated at FIG. 3 (for simplicity, a case is considered where the DBI and swap signals are not considered part of the two data channels). Consider bit time i=7 and i−1=6. As seen at sub-columns 7A-7G, the minimum number of bit transitions achieved by only selectively applying DBI at bit time 7 (i.e., while not swapping data between the first and second bus) is 5. This minimum is found by examining the number of bit transitions on each channel in the events DBI is or is not applied. By applying DBI on each channel, the transition count on the first data channel is 3 and the transition count on the second data channel is 2. Further, as seen at sub-columns 8A-8G, the minimum number of bit transitions achieved by swapping data between the first and second channels and selectively applying DBI is also 5. This minimum is found by examining the number of bit transitions on each channel when data is swapped between the first and second channel and DBI is or is not applied. As seen at sub-column 8B, where data is swapped and DBI is applied, a bit transition count on the first channel is 2. Also, as seen at sub-column 8C, where data is swapped and DBI is not applied, the transition count on the second data channel is 3.

Once these determinations are made, steps can be taken to select a combination of DBI and swapping operations to correct an intermediate voltage, e.g., VMID, that has drifted from a target range or target value. In this case and referring to the system depicted at FIG. 1, if VMID is determined to be within an acceptable band (e.g., a center band) between the high and low voltage, in a target range, or at or near a target value, the swapping operation can be performed or not at this bit time without significant consequence, as either case may yield a minimum of 5 bit transitions across the 16 transmitters. If no correction of the intermediate voltage is needed, it is generally desirable to minimize the number of bit transitions across the system as doing so minimizes SSN and other deleterious effects. However, if VMID is determined to be below a center band, target range, or target value, the swapping operation should not be performed at this bit time so that a higher number of transitions occur on the first data channel (or toward the high voltage node), thereby tending to increase the intermediate voltage towards the midpoint between the high and low voltage nodes. On the other hand, if VMID is determined to be higher than a center band, target range, or target value, the swap operation should be performed at this bit time so that more bit transitions occur on the second data bus, thereby tending to decrease the intermediate voltage towards the midpoint between the high and low voltage nodes.

These calculation, comparison, and selection steps can be performed in hardware, software, or a combination of both. For example, transmitter 101 may include logic or a processor and stored firmware/software to perform the selective or conditional use of DBI and/or swapping operations as described. Likewise, receiver 102 can include logic or a processor and stored firmware/software for performing inverse operations of the DBI and swap operations performed by transmitter 101 to recover data as necessary.

It should be appreciated that, in the example above, the DBI and/or swap operations were selectively chosen so that, even if a disparate number of bit transitions were internally created on the individual bit channels to correct an intermediate voltage, those operations were applied with the constraint of still minimizing the number of bit transitions within the group of stacked channels. In such an embodiment, a particular DBI/swap configuration that would move the intermediate voltage toward the desired target will only be selected if it is one of the one or more configurations that minimize the bit transitions for the current bit time. This approach is best suited for scenarios where the intermediate voltage deviation does not indicate a large correction. However, where a more extreme correction is required, the DBI and/or swap operations can be selectively chosen so that a greater disparity in bit transitions occurs between the first and second data bus-even if the selected DBI/swap configuration does not produce the minimum number of bit transitions possible for the current bit time. This approach may come at the cost of increased noise and power consumption, but will produce a stronger corrective effect when needed.

Figure 4:
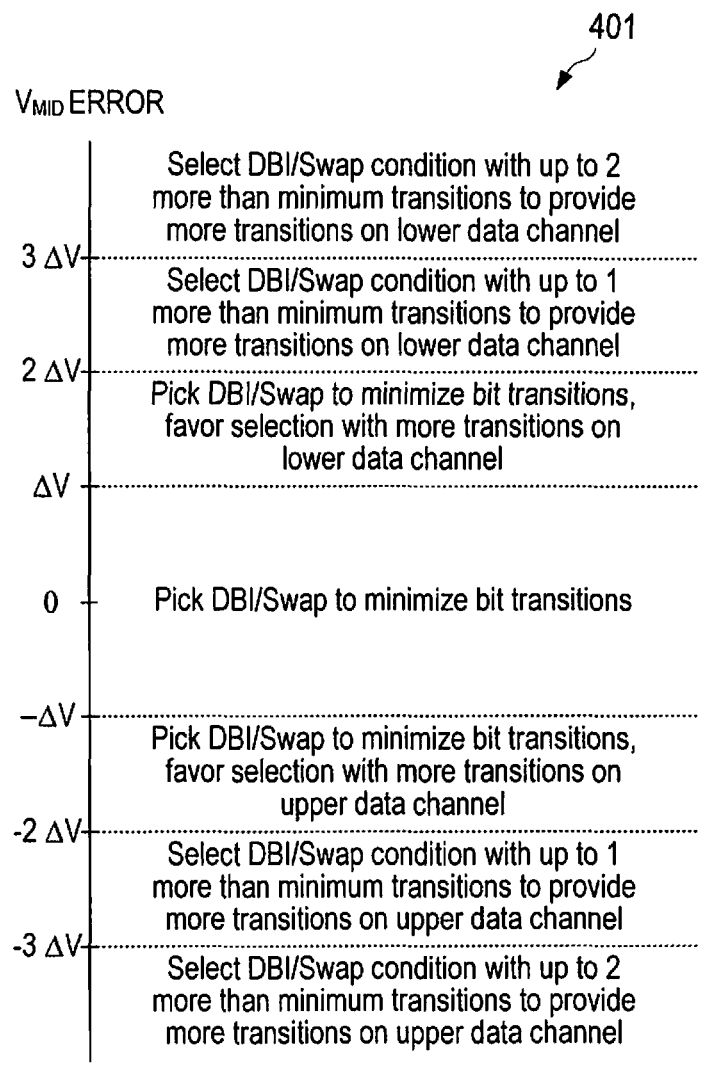
FIG. 4 is a diagram illustrating certain aspects of an embodiment.

FIG. 4 illustrates an approach to implementing the concepts described with reference to FIG. 3. An intermediate voltage deviation or error ($V_{MID}$ ERROR) 401 is compared against several thresholds, e.g., $\pm\Delta V$, $\pm 2\Delta V$, $\pm 3\Delta V$, etc. As the error 401 deviates further from zero, stronger effects are enabled and/or considered to correct or mitigate error 401. For instance, when the error 401 lies in the range $-\Delta V < V_{MID}$ ERROR $< \Delta V$, a DBI/Swap configuration is selected to minimize bit transitions on the channels (when two or more configurations result in the same minimum, the selected configuration in this embodiment need not be based on upper/lower bit transition balance). When the error 401 lies in the range $-2\Delta V < V_{MID}$ ERROR $\leq \Delta V$, and two or more configurations produce the minimum, a configuration is selected that produces the most transitions on the upper channel. Likewise, when the error 401 lies in the range $\Delta V \leq V_{MID}$ ERROR $< 2\Delta V$, and two or more configurations produce the minimum, a configuration is selected that produces the most transitions on the lower channel.

When the absolute value of the error 401 rises above $2\Delta V$, a configuration having one more than the minimum number of transitions will be favored if it produces more transitions on the side requiring them. Likewise, when the absolute value of the error 401 rises above $3\Delta V$, a configuration having two more than the minimum number of transitions will be favored if it produces more transitions on the side requiring them.

Other embodiments can collapse these ranges in different ways to produce different effects. For instance, no central comparison region may exist, with the system selecting DBI/swap during every bit time based on whether $V_{MID}$ is above or below a desired value $V_{REF}$. In practice, $V_{MID}$ can be compared directly to a desired reference $V_{REF}$ and desired deviation points $V_{REF} \pm \Delta V$, for example, to select the operating mode. Instead of allowing only incrementally worse DBI/swap configurations (from a power and noise standpoint), an embodiment can select the configuration with the largest transition imbalance in the direction desired, even if it produces a large number of transitions.

It is also of note that depending on what other measures exist in the system to stabilize the midpoint voltage, too strong of a deliberate transition-shifting effect may be avoided in order to prevent oscillation and wasted power due to lag in the response time. For instance, a given bitline on the upper stack that is currently driven "low" (to the midpoint voltage) must be toggled twice in order to provide charge to the midpoint voltage—the first toggle raises the bitline high, adding charge to the bitline but not the midpoint voltage node, and the second toggle dumps the charge from the bitline to the midpoint voltage node. Meanwhile, even if fewer transitions are initiated on the lower stack, those that toggle to drive "high" will remove charge from the midpoint voltage node. Thus, depending on the bit patterns observed, it may take from one to four or more bit times of favoring the upper or lower channels to actually force a net charge increase (or decrease) on the midpoint. By the time a change in net charge is observed, a system that allows large disparities of upper/lower transitions per bit time may be in a state that causes overshoot and too large of a change in the opposite direction.

Further, as discussed above, in certain embodiments an extra DBI or "inversion" bit and extra "swap" bit may be transmitted on each data channel using additional sub-channels. One swap bit can be placed on either the upper or lower channel with no swap bit on the corresponding channel, where swap bit use will cause a midpoint imbalance that will require correction as described above. Alternately, two swap bits, one per channel, can be used to transmit the swap condition, where for instance two swap bits at the same level signifies no swap and two swap bits at different levels signifies swap. The swap channel to be toggled (when needed) is then selected to help move the midpoint voltage in the desired direction. Two swap bits can also be used to transmit additional permutations, for instance one of the following four configurations: no swap, swap upper/lower, swap nibbles within channels, or swap both nibbles and channels. Other possible permutations include the swap of endian-ness, or other swizzled permutations, as limited only by the number of permutations one might compare. In some embodiments, consideration can be given to the effect of changing the DBI/ inversion bits and swap bits between bit times. That is, maintaining the DBI and inversion bits in the same binary state between bit times would reduce the number of bit transitions on each channel and the system overall. With this in mind, a second order optimization includes selectively choosing to perform the DBI and/or swap operation at a bit time (i) based on the binary states of the DBI/inversion and swap bits themselves at bit time (i−1).

Figure 5:
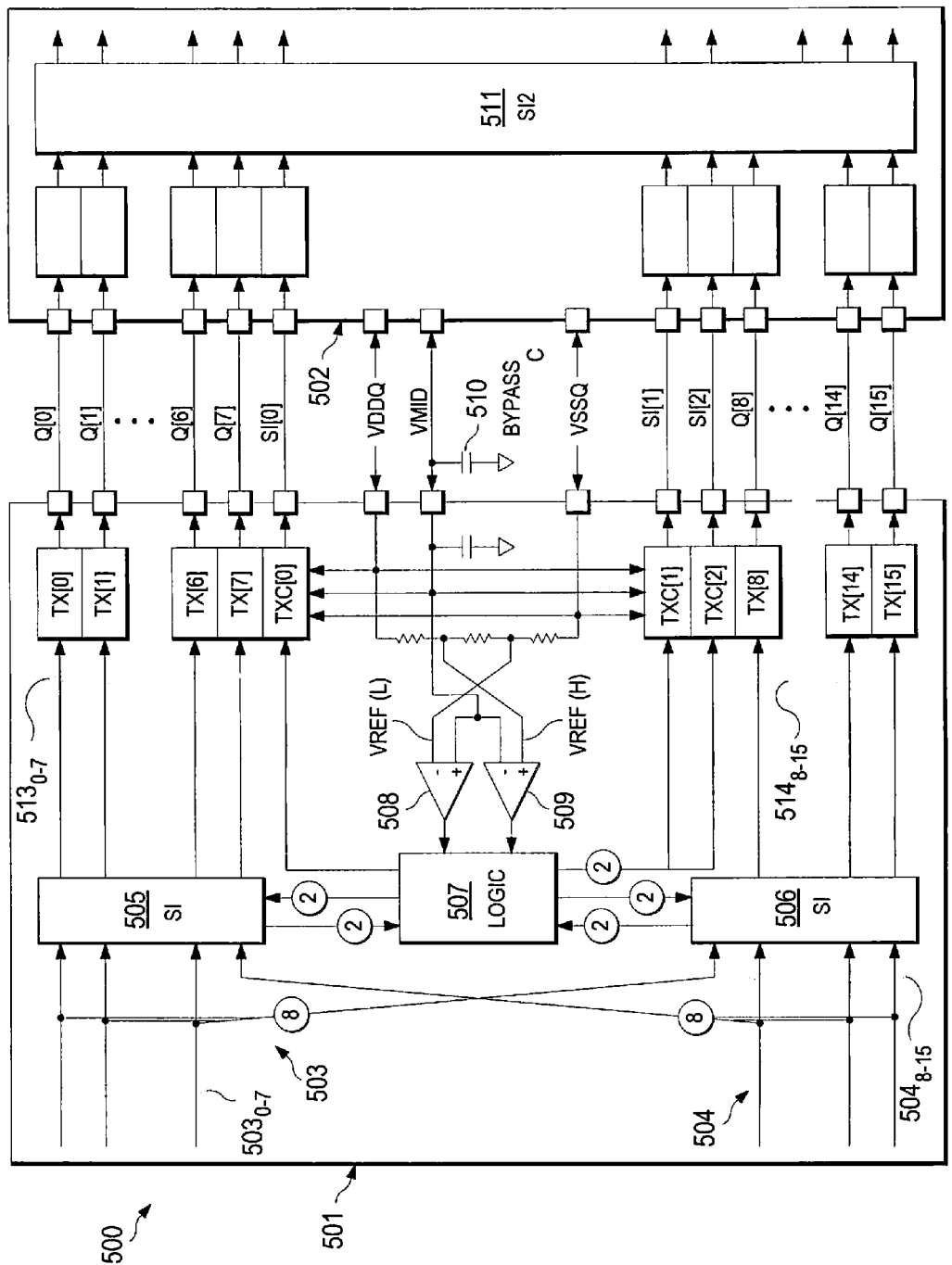
FIG. 5 depicts aspects of an embodiment of a communication system in which concepts described herein are applied.

FIG. 5 depicts system components in more detail that enable the selective or conditional use of DBI and/or swapping operations to control an intermediate voltage about a target value or range that can be implemented in systems such as those depicted in FIG. 1. FIG. 5 can represent either a source-terminated or a receiver terminated system, with a logic block 507 selected appropriate to the termination type. Similar to the discussion related to FIG. 1, a transmitter 501 encodes bit streams from a first parallel data channel 503 and a second parallel data channel 504, and drives the encoded data to a receiver 502 via nineteen sub-channels Q[0.15] and SI[0.2]. System 500 is a stacked system, where a first group of transmitters TX[0.7] and TXC[0] driving signals over Q[0.7] and SI[0] are coupled in parallel between a voltage node supplying a high voltage, VDDQ, and a voltage node supplying an intermediate voltage, VMID. A second group of transmitters TX[8.15] and TXC[1.2] driving signals over Q[8.15] and SI[1.2] are coupled between the intermediate voltage node VMID and a voltage node supplying a low voltage, VSSQ. The embodiment depicted in FIG. 3 operates in half-swing mode so that the first group of transmitters, TX[0.7] and TXC[0], signal within approximately one half of the available voltage range, i.e., voltages between VDDQ and VMID, and the second group of transmitters, TX[8.15] and TXC[1.2], signal within the remainder of the available voltage, i.e., voltages between VMID and VSSQ.

For operation in half-swing mode, communication system 500 maintains an intermediate reference voltage, VMID, about a central band, target range, or target point between a high voltage, VDDQ, and a low voltage, VSSQ. In the embodiment depicted at FIG. 3, logic blocks 505, 506, and 507 correspond to swap/invert logic 110 illustrated at FIG. 1 and facilitate the selective or conditional performance of DBI and/or swapping operations to accomplish same. While each of blocks 505, 506, and 507 are shown separately, it will be understood by those in the art that functions performed by each block can be collocated in a single block, or separated in different blocks according to system parameters and the like.

Each of logic blocks 505 and 506 may comprise logic to perform multiplexing and switching functions and the like and have inputs coupled to each of data channel 503 and 504. In a normal, or non-swapped, mode of operation, logic block 505 transmits bit streams received from data channel 503 and logic block 506 transmits streams received from data channel 504. However, consistent with the swapping operations described herein, logic block 505 transmits bit streams received from data channel 504 and logic block 506 transmits bit streams received from data channel 505 when bits are swapped between data channel 503 and 504. As will be discussed in greater detail, logic blocks 505 and 506 can include logic to find the sum of bit transitions on data channel 503 and data channel 504, respectively, between bit time i−1 and i. Also, logic block 505 can include logic to find the sum of bit transitions by comparing a bit stream transmitted on data channel 503 at bit time i−1 and the bit stream transmitted on data channel 504 at bit time i. Similarly, logic block 506 can include logic to find the sum of bit transitions by comparing the bit stream transmitted on data channel 504 at bit time i−1 and the bit stream transmitted on data channel 503 at bit time i. The summed information is output by each of logic blocks 505 and 506 to logic block 507.

Logic block 507 has inputs coupled to logic blocks 505 and 506 to receive summed bit transition information from each. Logic block 507 also has inputs coupled to a first comparator 508 and a second comparator 509. Each of comparators 508 and 509 include a reference node coupled to an intermediate reference voltage node, VMID, and a data node. First comparator 508 includes a data node coupled to a first threshold voltage, VREF(L), and second comparator 509 includes a data node coupled to a second threshold voltage, VREF(H). In the illustrated embodiment, VREF(L) and VREF(H) are threshold voltages that define a central band or target range for which VMID should be maintained. VREF(L) and VREF(H) can be generated in different ways, e.g., internally generated by the transmitter or receiver during start up, set as an initial system parameter, or changed as a function of VMID, VDDQ, and VSSQ. In this way, each threshold voltage can be static or dynamic. According to the illustrated embodiment, each of VREF(L) and VREF(H) are derived from resistor/divider circuits using VDDQ and VSSQ as input voltages. As such, VREF(L) and VREF(H) can be modified by changing the effective resistance in the corresponding resistor/divider circuit defining its value. Using comparator outputs from first comparator 508 and second comparator 509, logic block 507 is informed when VMID tracks outside of the range between VREF(L) and VREF(H).

According to one implementation, in response to inputs received from logic block 505, logic block 506, first comparator 508, and second comparator 509, logic block 507 influences the number of bit transitions that occur over output data channels 513 and 514 as necessary to keep or maintain the value of VMID between the values of VREF(L) and VREF(H). In such an implementation, when VMID is less than the VREF(L) threshold, logic block 507 can, e.g., enable/disable DBI on one or both of data channel 513 and data channel 514, and/or enable the swapping of data between data channel 503 and data channel 504 to deliberately reduce the relative number of bit transitions on data channel 514 (i.e., decrease supply current used to transmit data channel 514) and/or deliberately increase the relative number of bit transitions on data channel 513 (i.e., increase supply current used to transmit data channel 513). According to the illustrated embodiment, the resulting relative increase in average supply current per bit on the upper drivers as compared to the lower drivers can add charge to capacitor 510 to cause VMID to increase. Likewise, when VMID is greater than the VREF(H) threshold, logic block 507 can, e.g., enable/disable DBI on one or both of data channel 513 and data channel 514, and/or enable the swapping of data between data channel 503 and data channel 504 to deliberately increase the relative number of bit transitions on data channel 514 (i.e., increase supply current used to transmit data channel 514) and/or decrease the relative number of bit transitions on data channel 513 (i.e., decrease supply current used to transmit data channel 513). The resulting relative increase in average supply current per bit on the lower drivers as compared to the upper drivers removes charge from capacitor 510 and causes VMID to decrease. As such, logic block 507 will deliberately shift the bit transition count by, e.g., overriding a normal operation of DBI and swapping data between channels over bit times to correct a wayward intermediate reference voltage—even at the expense of additional supply current if necessary.

It should be appreciated that the greater the disparity in the number of bit transitions between data channel 513 and data channel 514, i.e., the greater the difference in supply current there between the corresponding driver groups, the greater the tendency of VMID to drift toward the voltage supply of the channel having the greater number of transitions. Accordingly, logic block 507 can initiate DBI, override DBI, and/or swap data between data channel 503 and data channel 504 to create a larger or smaller disparity in the number of bit transitions, e.g., according to the degree to which VMID has drifted from its target range or target value or the length of time VMID has remained out of the target range.

These functions are enabled by output inversion and swap signals sent from logic block 507 to each of logic blocks 505 and 506, which then transmit data over each of their respective sub-channels according to the inversion and swap signals received from logic block 507. As such, logic block 507 can transmit the inversion and/or swap signals directly to receiver 502, or instead, to other logic blocks in transmitter 501 that utilize those signals before transmitting same to receiver 502. In either event, once the transmitted information is received at receiver 502, logic block 511 performs inverse operations of the inversion and/or swap signals, when necessary, to recover the original data and send that data to its destination.

Figure 6A:
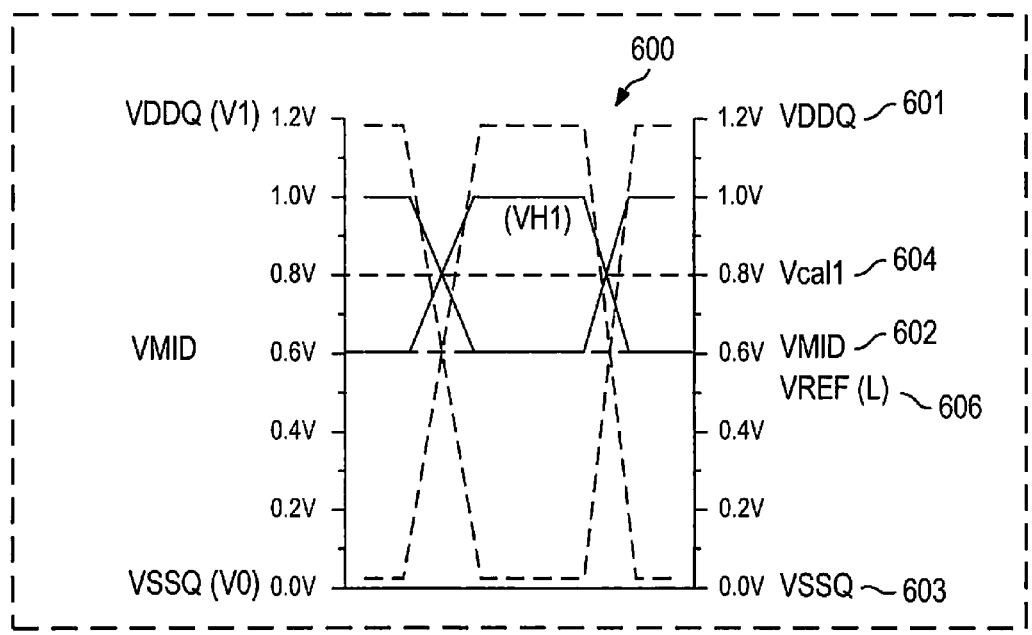
FIG. 6A is a waveform diagram depicting a continuous-time data stream from a transmitter operating in half-swing mode using a voltage waveform between a high voltage and an intermediate voltage, where the intermediate voltage is compared to a low threshold voltage according to an embodiment.
Figure 6B:
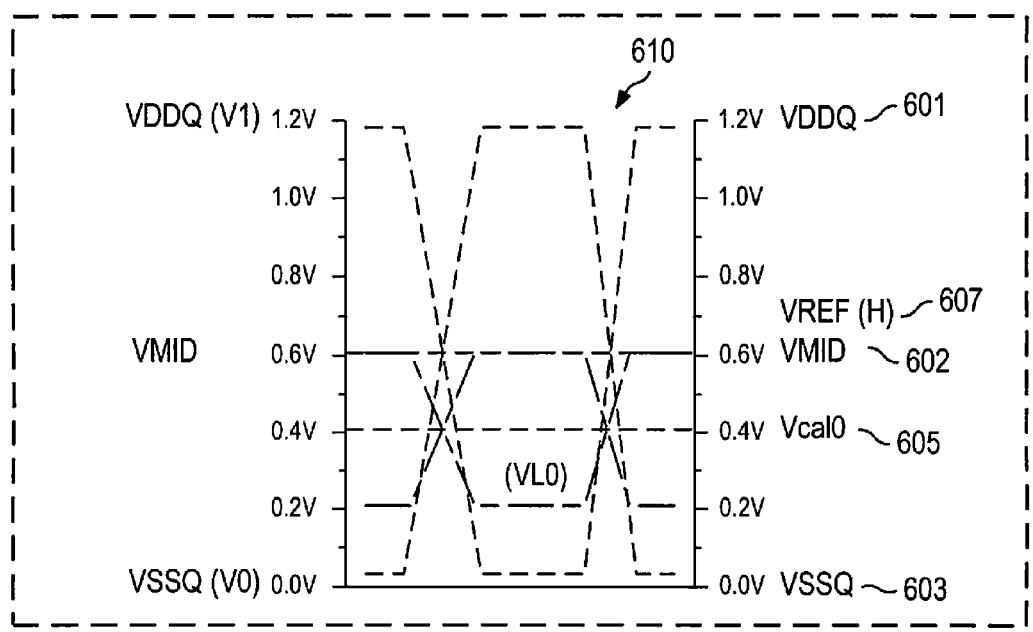
FIG. 6B is a waveform diagram depicting a continuous-time data stream from a transmitter operating in half-swing mode using a voltage waveform between an intermediate voltage and a low voltage, where the intermediate voltage is compared to a high threshold voltage according to an embodiment.

FIG. 6A is a waveform diagram depicting a noise-free and jitter-free data eye for a transmitter operating in half-swing mode using a voltage waveform between a high voltage VH1 corresponding to, e.g., VDDQ 601, and an intermediate voltage VMID where the intermediate voltage VMID is compared to a low threshold voltage VREF(L), and FIG. 6B is a waveform diagram depicting a noise-free and jitter-free data eye for a transmitter operating in half-swing mode using a voltage waveform between an intermediate voltage VMID and a low voltage VL0 corresponding to, e.g., VSSQ 603, where the intermediate voltage VMID is compared to a high threshold voltage VREF(H) according to an embodiment. Referring to FIGS. 6A-6B, Vcal1 604 and Vcal0 605 are comparison reference voltages that can be generated internally by a receiver component, e.g., receiver 502 with resistor/divider circuits or similar circuits. Specifically, Vcal1 604 is derived from VH1/VMID 602 and Vcal0 605 is derived from VMID 602/VL0. Vcal1 604 and Vcal0 605 may also be sourced externally from, e.g., transmitter 101. For example, in one embodiment Vcal1 604 and Vcal0 605 may be calibrated during power-up using test patterns. In this embodiment, VMID 602 is a midpoint voltage that can be generated by a linear regulator or equivalent, where the linear regulator ideally supplies the time-averaged difference in current used by each set of drivers for channel 513 and channel 514. However, VMID 602 can also be generated by other means in other embodiments. Many methods of establishing and maintaining appropriate reference voltages are well known to those of skill in the art and are therefore omitted for brevity. Also, VREF(L) 606 and VREF(H) 607 can be generated in different ways, e.g., internally generated by the transmitter or receiver during start up, set as an initial system parameter, or changing as a function of VMID 602, VDDQ 601, and VSSQ 603. In this way, each threshold voltage can be static or dynamic. According to the illustrated embodiment, each of VREF(L) 606 and VREF(H) 607 are derived from resistor/divider circuits using VDDQ 601 and VSSQ 603 as input voltages.

Figure 7:
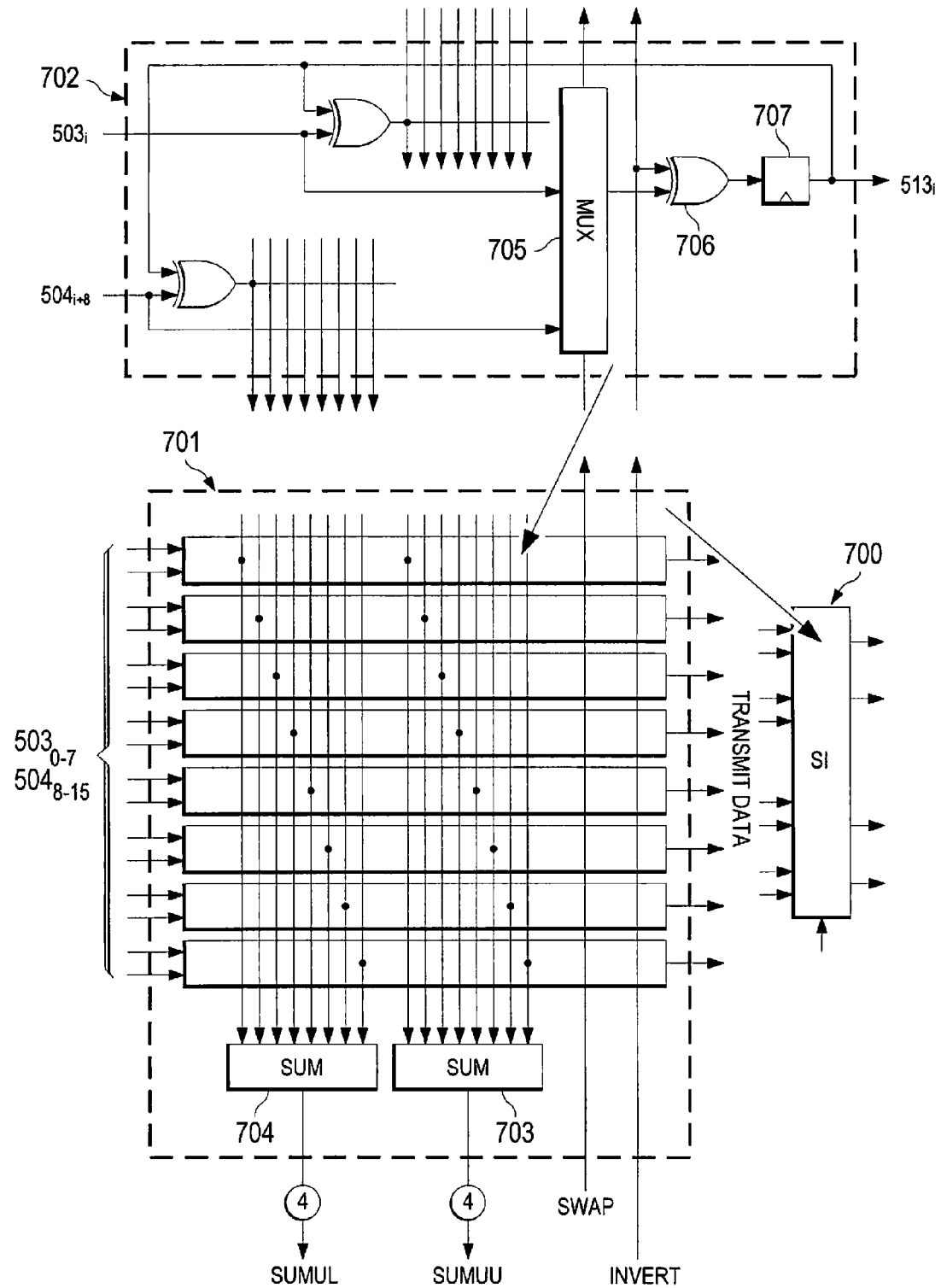
FIG. 7 depicts components of a transmitter according to an embodiment.

FIG. 7 depicts an embodiment of logic that can be implemented to enable transmission of bit streams according to the selective or conditional use of DBI and/or swap operations as described herein to minimize power consumption and/or correct an intermediate voltage imbalance in systems such as those depicted in FIGS. 1 and 5. Accordingly, FIG. 7 depicts in greater detail an embodiment of logic that can be implemented in one or more of blocks 505 and 506, previously discussed. While FIG. 7 depicts a component applicable to a source-terminated communication system, concepts described therein readily apply to receiver-terminated communication systems as well.

According to FIG. 7, a transmit logic block 700 includes an invert logic block 701, which includes multiple instances of a compare/swap logic block 702. As mentioned above, each compare/swap logic block 702 in invert logic block 701 has inputs coupled to a respective sub-channel of a first data channel and a respective sub-channel of a second data channel, e.g., data channel 503 (to receive bits over sub-channels $505_0$-$503_7$) and data channel 504 (to receive bits over sub-channels $504_8$-$504_{15}$).

Compare/swap block 702 performs two XOR comparisons between the last bit 513; output from block 702 (at bit time i−1), and respectively bit 503; and bit $504_{i+8}$ (at bit time i). The outputs of the two XOR comparisons are provided, respectively, to two summing blocks 703, 704 in invert logic block 701. Each XOR comparison provides a logic 1 if the two compared bits are different and a logic 0 if the two compared bits are the same.

Summing blocks 703 and 704 find first and second sums of bit transitions for the respective first and second comparisons of all compare/swap blocks 702 resident in invert logic block 701. This produces two respective potential transition number indications—one, SUMUL, for placing data from the lower input channel 504 on the upper output channel 513 at the next bit time, and the other, SUMUU, for placing data from the upper input channel 503 on the upper output channel 513 at the next bit time to output data channel 513. The summed bit transition information is output from block 507 for use. This description applies specifically to block 507 as used for upper swap/invert logic block 505 (FIG. 5). When used for lower swap/invert logic block 506, block 507 produces potential transition number indications SUMLU and SUMLL (not shown)—SUMLU is for placing data from the upper input channel 503 on the lower output channel 514 at the next bit time, and SUMLL is for placing data from the lower input channel 504 on the lower output channel 514 at the next bit time.

In addition to performing summing comparisons, invert logic block 701 also performs data inversion and multiplexing of the input channels onto an output channel. Within each compare/swap block 702, a multiplexer MUX 705 receives an upper input sub-channel 503 and a lower input sub-channel 504, with a SWAP signal from logic block 507 selecting one of these two input sub-channels to place at one input of an XOR gate 706. Logic block 507 provides an INVERT signal as the other input of XOR gate 706. The output of XOR gate 706 is provided as an input to a data latch 707, which provides a current bit for the corresponding output sub-channel of block 702.

Logic block 507 (FIG. 5) receives the summed potential transition information and processes that information, along with information about the current midpoint voltage. Logic block 507 then produces INVERT values for the upper and lower output channels and a SWAP value (which applies to both output channels).

According to a standard use of DBI, parallel systems address SSN using DBI. In an eight-bit example, the standard use of DBI includes an extra sub-channel to convey a ninth bit, or DBI bit, so that when the sum of bit transitions for a next bit time are determined to exceed 4, the DBI bit inverts the bit on each sub-channel for the next bit time, and signals the inversion on the ninth sub-channel. The DBI coding scheme reduces the total current drawn from the power supply for what would otherwise be power-intensive bit times. Assume, for example, an eight-bit parallel channel that conveys logic zero symbols by drawing current from a supply node. The worst-case current in such a case would occur when transmitting eight zero bits in parallel during one bit time. Using DBI, the ninth sub-channel is used to signal an inversion of the bits for each byte that has more zeros than ones. For example, 00000111-1 (the last bit is the DBI bit) becomes 11111000-0. Setting the DBI bit to zero in this example tells the receiver to invert the bits to restore the original byte.

However, transmit logic blocks 505, 506, and 507 enable a non-intuitive use of a DBI coding scheme. Instead of just comparing, for a single channel, the results of turning inversion on or off for an upcoming bit time, logic blocks 505 and 506 compare inversion on and off for two possible channel assignments, generating eight signaling possibilities for each bit transition. This not only reduces the probabilistic number of transitions/bit time achievable as compared to two channels running DBI independently, but it allows power balancing between the two channels—often with little or no power penalty as compared to running two independent DBI channels. As another degree of freedom in creating a current imbalance to correct a reference voltage, the threshold number of bit transitions that would normally trigger a standard DBI operation can be adjusted. This adjustment scheme can be implemented in logic block 507. Accordingly, a communication system may intentionally require a larger number of bit transitions on a given data channel before performing a DBI operation if doing so would create an undesirably disparate number of transitions between data buses, even at the expense of more supply current. In this way, adjusting the number of transitions that would trigger a DBI operation provides yet another feature the communication system can exploit to correct the reference voltage.

Figure 8:
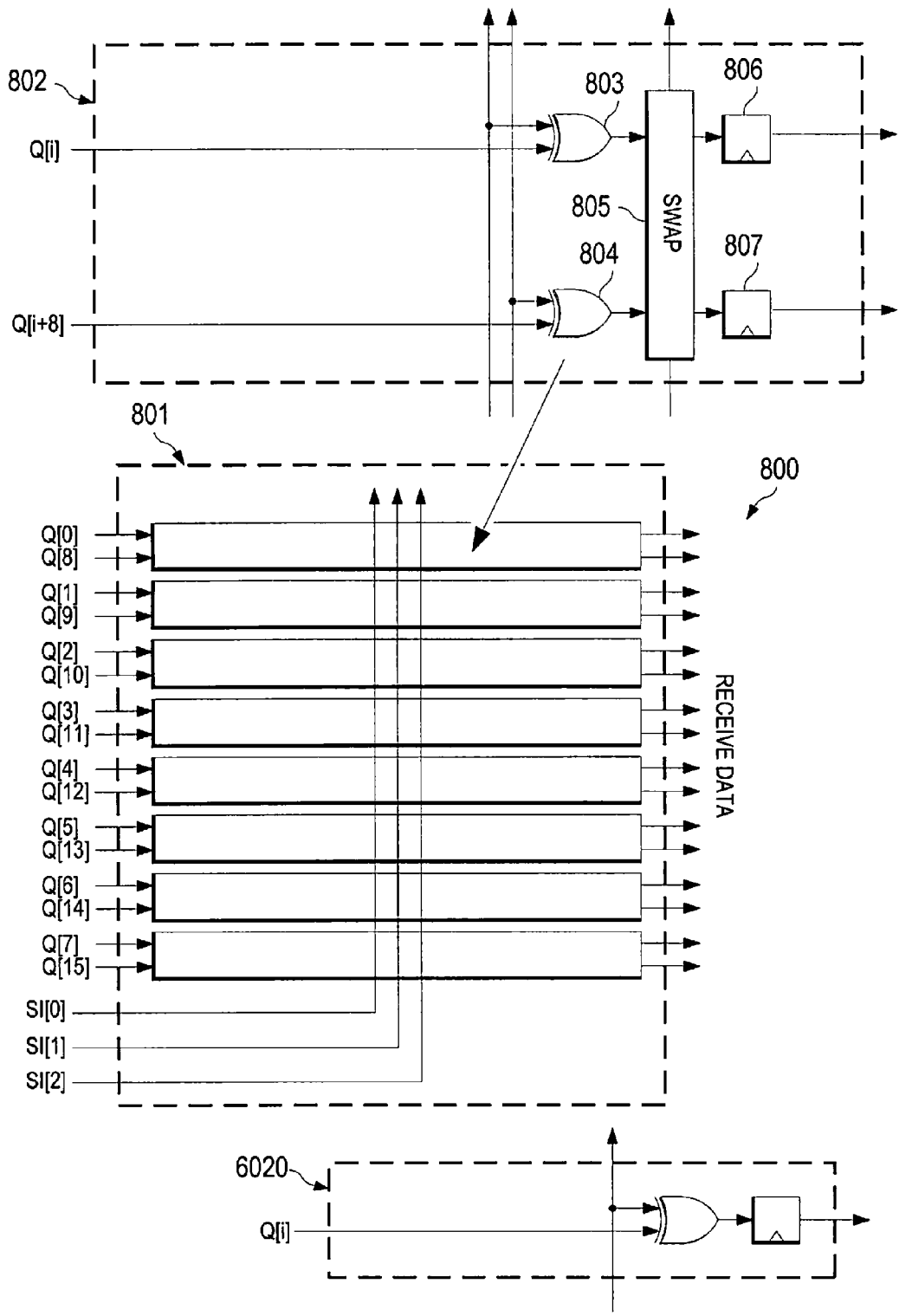
FIG. 8 depicts components of a receiver according to an embodiment.

FIG. 8 depicts an embodiment of logic that can be implemented to effectively receive and recover bit streams transmitted according to the selective or conditional use of DBI and/or swap operations as described herein to minimize power consumption and/or correct an intermediate voltage imbalance in a system such as that depicted in FIG. 5. Accordingly, FIG. 8 depicts in greater detail an embodiment of logic found in SI2 block 511, previously discussed. While FIG. 8 depicts a component of source-terminated system, concepts described therein readily apply to receiver-terminated systems as well.

Receive logic block 800 includes an inverse invert logic block 801, which contains multiple instances of an inverse swap logic block 802. Inverse invert logic block 801 has inputs coupled to the receiver-recovered FIG. 5 channel signals S[0.2] and Q[0.15]. The SI[0] and SI[1] signals signify whether a DBI operation has been performed on the first data channel and second data channel, respectively, for the current bit time. In response, inverse invert logic block 801 performs inverse DBI operations as necessary to recover the non-inverted data. The SI[2] signal signifies whether a channel swap operation has been performed between the data channels for the current bit time. In response, inverse invert logic block 801 performs a channel-to-channel inverse swap operation as necessary to recover the swapped data.

Each invert swap block 802 receives the invert and swap signals SI[0.2], an upper data sub-channel Q[i], and a corresponding lower data sub-channel Q[i+8]. A first XOR gate 803 performs data inversion on Q[i] when SI[0] is asserted, and a second XOR gate 804 performs data inversion on Q[i+8] when SI[1] is asserted. A SWAP multiplexer 805 receives the outputs of XOR gates 803 and 804, and either switches them or not between two corresponding output channels, depending on whether SI[2] is asserted. Finally, two latches 806 and 807 latch the two outputs from SWAP multiplexer 805 at an appropriate instant for the current bit time, for output to the receiving device internal functions.

Figure 9:
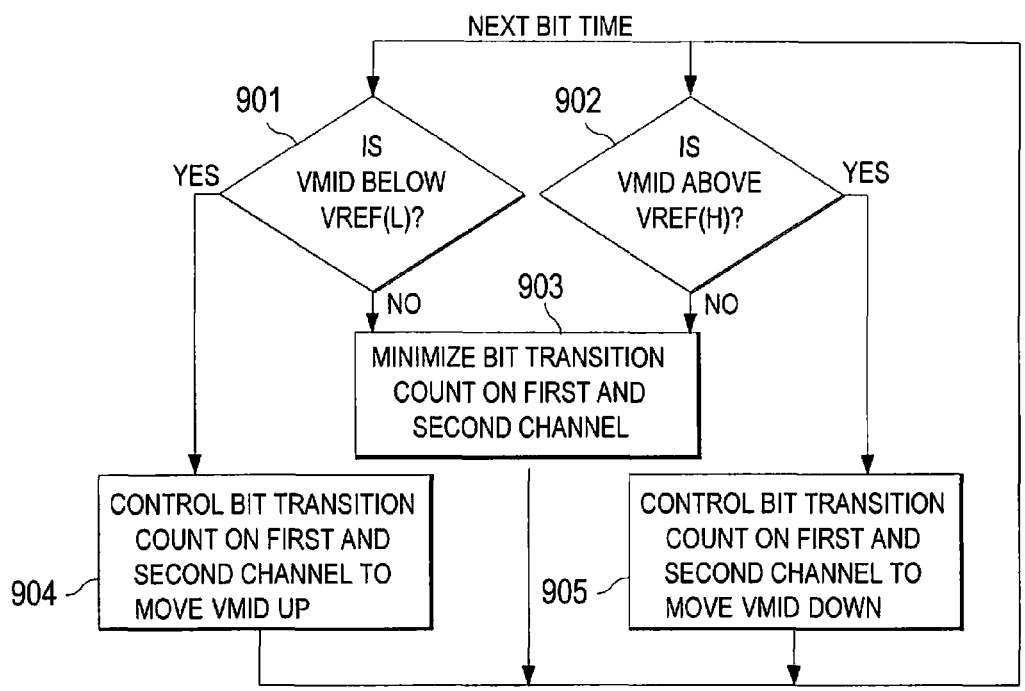
FIG. 9 is a flow chart of a process for maintaining an intermediate voltage about a target value or a target range using conditional inversion and/or swap operations according to an embodiment.

FIG. 9 contains a flow chart for one embodiment of a process for maintaining an intermediate reference voltage about a target value or a target range using the conditional inversion and/or swap operations described above. At step 901, an intermediate reference voltage, e.g., VMID, is compared to a first voltage threshold, e.g., VREF(L), to determine whether the intermediate voltage is below that threshold. At step 902, the intermediate voltage is concurrently compared to a second voltage threshold, e.g., VREF(H), to determine whether the intermediate voltage is above the second voltage threshold. At step 903, if the intermediate voltage is between the first and second threshold, then the number of bit transitions occurring on the first data channel and the second data channel are minimized while giving consideration to keeping the number of bit transitions that occur between the first and second data channel the same or approximately the same. Doing so 1) minimizes power consumed by the communication system, and 2) operates to keep the intermediate voltage between the threshold voltages. At step 904, if the intermediate voltage is determined to be below the first threshold, the number of bit transitions occurring on the first data channel and the second data channel are controlled to move the intermediate voltage upwards. At step 905, if the intermediate voltage is determined to be above the second threshold, the number of bit transitions occurring on the first data channel and the second data channel are controlled to move the intermediate voltage downwards. Controlling the number of bit transitions occurring on the first data channel and the second data channel to move the intermediate voltage upward or downward can involve 1) selecting or overriding a DBI operation on the first and/or second data channel, and/or 2) swapping data between the first and second data channel, with the swapping or overriding occurring with respect to the swapped data. Steps 903, 904, and 905 each return to steps 901/902 to repeat the process for the subsequent time interval.

In addition to embodiments that selectively override DBI but do not swap, other embodiments can reduce the transmission possibilities from eight to, e.g., four. For instance, two swap/invert lines can transmit four different states with a selected combination of allowable swap and invert combinations, either static or dynamic based on a current state. A single line can also be used to transmit a swap only signal, with no DBI capability.

Figure 10:
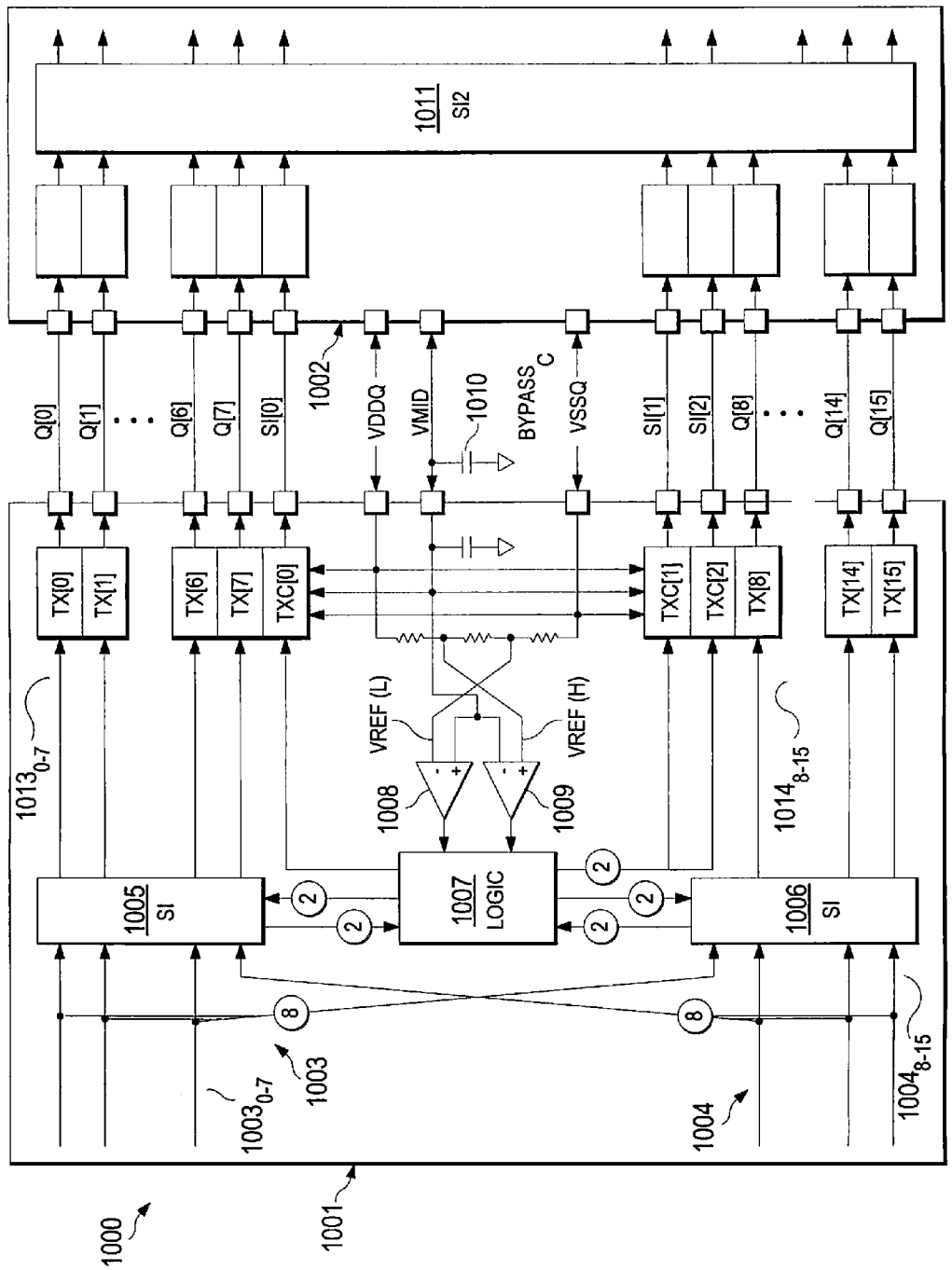
FIG. 10 depicts aspects of another embodiment of a communication system in which concepts described herein are applied.

FIG. 10 depicts an alternative embodiment that enables the selective or conditional use of DBI to control an intermediate voltage about a target value or range. According to FIG. 10, system 1000 differs from system 500 depicted in FIG. 5 in that it does not utilize the swapping function of system 500. Similar to the discussion related to FIG. 5, the system depicted at FIG. 10 can represent either a source-terminated or a receiver terminated system, with a logic block 1007 selected appropriate to the termination type. A transmitter 1001 encodes bit streams from a first parallel data channel 1003 and a second parallel data channel 1004, and drives the encoded data to a receiver 1002 via eighteen sub-channels Q[0.15] and SI[0.1]. A first group of transmitters TX[0.7] and TXC[0] drive signals over Q[0.7] and SI[0] and are coupled in parallel between a voltage node supplying a high voltage, VDDQ, and a voltage node supplying an intermediate voltage, VMID. A second group of transmitters TX[8.15] and TXC[1] drive signals over Q[8.15] and SI[1] and are coupled between the intermediate voltage node VMID and a voltage node supplying a low voltage, VSSQ. System 1000 operates in half-swing mode so that the first group of transmitters, TX[0.7] and TXC[0], signal within approximately one half of the available voltage range, i.e., voltages between VDDQ and VMID, and the second group of transmitters, TX[8.15] and TXC[1], signal within the remainder of the available voltage, i.e., voltages between VMID and VSSQ.

System 1000 maintains an intermediate reference voltage, VMID, about a central band, target range, or target point between a high voltage, VDDQ, and a low voltage, VSSQ, where logic blocks 1005, 1006, and 1007 facilitate the selective or conditional performance of DBI to accomplish same. While each of blocks 1005, 1006, and 1007 are shown separately, it will be understood by those in the art that functions performed by each block can be co-located in a single block, or separated in different blocks according to system parameters and the like.

Each of logic blocks 1005 and 1006 may comprise logic to perform multiplexing and switching functions and the like and have inputs coupled to each of data channel 1003 and 1004. Logic blocks 1005 and 1006 can include logic to find the sum of bit transitions on data channel 1003 and data channel 1004, respectively, between bit time i−1 and i. Also, logic block 1005 can include logic to find the sum of bit transitions by comparing a bit stream transmitted on data channel 1003 at bit time i−1 and the bit stream transmitted on data channel 1004 at bit time i. Similarly, logic block 1006 can include logic to find the sum of bit transitions by comparing the bit stream transmitted on data channel 1004 at bit time i−1 and the bit stream transmitted on data channel 1003 at bit time i. The summed information is output by each of logic blocks 1005 and 1006 to logic block 1007.

Logic block 1007 has inputs coupled to logic blocks 1005 and 1006 to receive summed bit transition information from each. Logic block 1007 also has inputs coupled to a first comparator 1008 and a second comparator 1009. Each of comparators 1008 and 1009 include a reference node coupled to an intermediate reference voltage node, VMID, and a data node. First comparator 1008 includes a data node coupled to a first threshold voltage, VREF(L), and second comparator 1009 includes a data node coupled to a second threshold voltage, VREF(H). As previously discussed, VREF(L) and VREF(H) are threshold voltages that define a central band or target range for which VMID should be maintained and can be static or dynamic. Using comparator outputs from first comparator 1008 and second comparator 1009, logic block 1007 is informed when VMID tracks outside of the range between VREF(L) and VREF(H).

In response to inputs received from logic block 1005, logic block 1006, first comparator 1008, and second comparator 1009, logic block 1007 influences the number of bit transitions that occur over output data channels 1013 and 1014 as necessary to keep or maintain the value of VMID between the values of VREF(L) and VREF(H). For example, when VMID is less than the VREF(L) threshold, logic block 1007 can, e.g., enable/disable DBI on one or both of data channel 1013 and data channel 1014 to deliberately reduce the relative number of bit transitions on data channel 1014 (i.e., decrease supply current used to transmit data channel 1014) and/or deliberately increase the relative number of bit transitions on data channel 1013 (i.e., increase supply current used to transmit data channel 1013). The resulting relative increase in average supply current per bit on the upper drivers as compared to the lower drivers adds charge to capacitor 1010 and causes VMID to increase. Likewise, when VMID is greater than the VREF(H) threshold, logic block 1007 can, e.g., enable/disable DBI on one or both of data channel 1013 and data channel 1014 to deliberately increase the relative number of bit transitions on data channel 1014 (i.e., increase supply current used to transmit data channel 1014) and/or decrease the relative number of bit transitions on data channel 1013 (i.e., decrease supply current used to transmit data channel 1013). The resulting relative increase in average supply current per bit on the lower drivers as compared to the upper drivers removes charge from capacitor 1010 and causes VMID to decrease. As such, logic block 1007 will deliberately shift the bit transition count by, e.g., overriding a normal operation of DBI to correct a wayward intermediate reference voltage—even at the expense of additional supply current if necessary.

It should be appreciated that the greater the disparity in the number of bit transitions between data channel 1013 and data channel 1014, i.e., the greater the difference in supply current between the corresponding driver groups, the greater the tendency of VMID to drift toward the voltage supply of the channel having the greater number of transitions. Accordingly, logic block 1007 can initiate DBI or override DBI between data channel 1003 and data channel 1004 to create a larger or smaller disparity in the number of bit transitions, e.g., according to the degree to which VMID has drifted from its target range or target value or the length of time VMID has remained out of the target range.

These functions are enabled by output inversion signals sent from logic block 1007 to each of logic blocks 1005 and 1006, which then transmit data over each of their respective sub-channels according to the inversion signals received from logic block 1007. As such, logic block 1007 can transmit the inversion a signals directly to receiver 1002, or instead, to other logic blocks in transmitter 1001 that utilize those signals before transmitting same to receiver 1002. In either event, once the transmitted information is received at receiver 1002, logic block 1011 performs inverse operations of the inversion signals, when necessary, to recover the original data and send that data to its destination.

Figure 11:
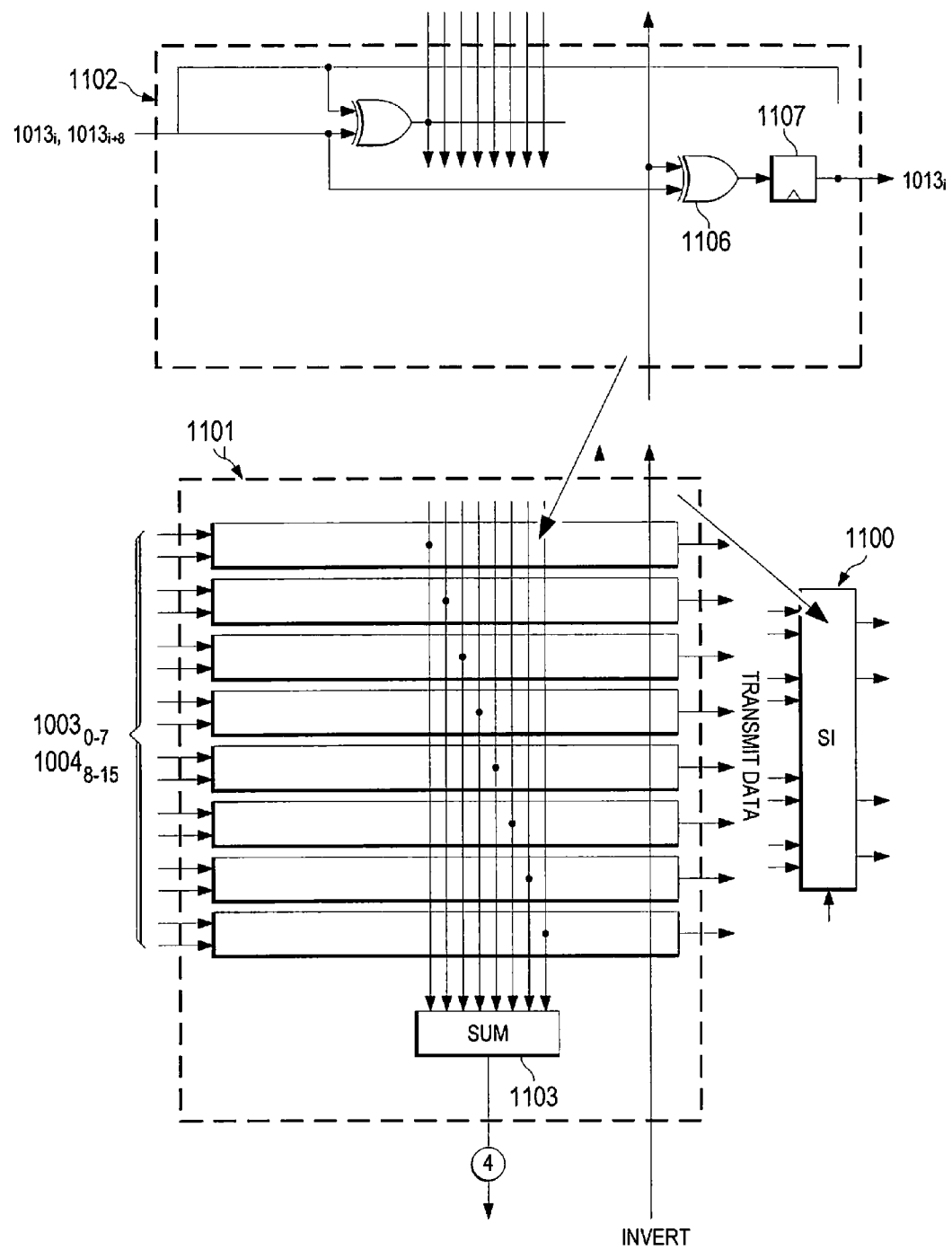
FIG. 11 depicts components of a transmitter according to another embodiment.

FIG. 11 depicts an alternative embodiment of logic that can be implemented to enable transmission of bit streams according to the selective or conditional use of DBI to minimize power consumption and/or correct an intermediate voltage imbalance in a system such as that depicted in FIG. 10. Accordingly, FIG. 11 depicts in greater detail an embodiment of logic that can be implemented in one or more of blocks 1005 and 1006, previously discussed.

A transmit logic block 1100 includes an invert logic block 1101, which includes multiple instances of a compare logic block 1102. Each compare logic block 1102 in invert logic block 1101 has inputs coupled to a respective sub-channel of a first data channel or a respective sub-channel of a second data channel, e.g., data channel 1003 (to receive bits over sub-channels $1003_0$-$1003_7$) or data channel 1004 (to receive bits over sub-channels $1004_8$-$1004_{18}$).

Compare block 1102 performs an XOR comparison between the last bit $813_j$, output from block 1102 (at bit time i−1), and respectively bit $103_j$ or bit $104_{j+8}$ (at bit time i). The output of the XOR comparisons is provided to summing block 1103 in invert logic block 1101. The XOR comparison provides a logic 1 if the two compared bits are different and a logic 0 if the two compared bits are the same.

Summing block 1103 finds the sum of bit transitions for the comparisons of all compare blocks 1102 resident in invert logic block 1101. The summed bit transition information is output from block 1101 for use by, e.g., logic block 807 (FIG. 8).

Invert logic block 1101 performs selective data inversion of the input channel onto the output channel. Within each compare block 1102, XOR gate 1106 receives an input sub-channel at one input and logic block 1007 provides an INVERT signal as the other input of XOR gate 1106. The output of XOR gate 1106 is provided as an input to a data latch 1107, which provides a current bit for the corresponding output sub-channel of block 1102.

Logic block 1007 (FIG. 10) receives the summed potential transition information and processes that information, along with information about the current midpoint voltage. Working together, transmit logic blocks 1005, 1006, and 1007 enable a non-intuitive use of a DBI coding scheme by comparing inversion on and off for two possible channel assignments, generating eight signaling possibilities for each bit transition. This reduces the probabilistic number of transitions/bit time achievable and allows power balancing between the two channels with little or no power penalty as compared to running two independent DBI channels. Further, as previously discussed, this selective use of DBI alone may create a current imbalance needed to correct a reference voltage, i.e., the threshold number of bit transitions that would normally trigger a standard DBI operation.

Figure 12:
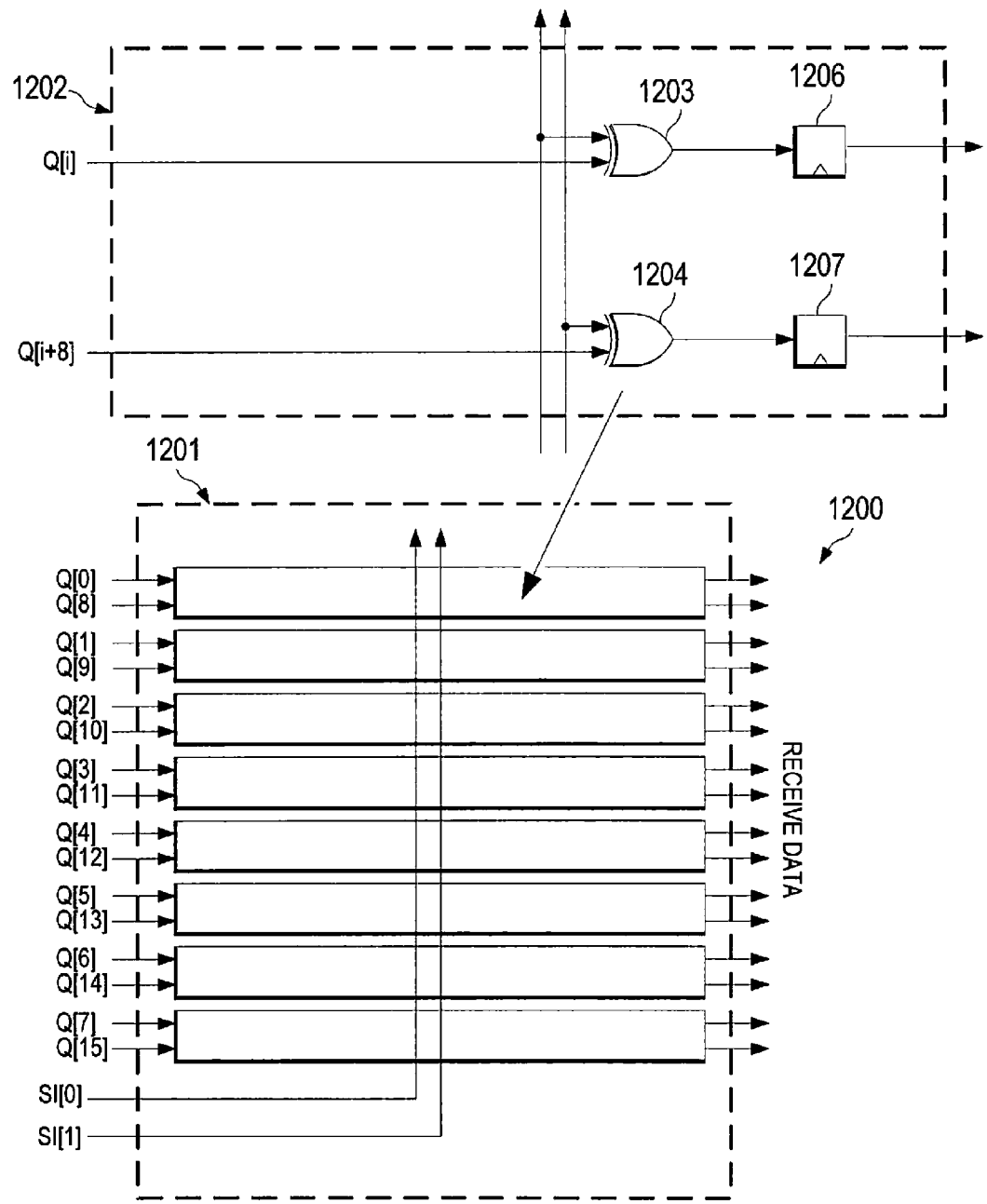
FIG. 12 depicts components of a receiver according to another embodiment.

FIG. 12 depicts an embodiment of logic that can be implemented to effectively receive and recover bit streams transmitted according to the selective or conditional use of DBI to minimize power consumption and/or correct an intermediate voltage imbalance in a system such as that depicted in FIG. 8. Accordingly, FIG. 12 depicts in greater detail an embodiment of logic found in SI2 block 1011, previously discussed.

Receive logic block 1200 includes logic block 1201, which contains multiple instances of an inverse invert logic block 1202. Logic block 1201 has inputs coupled to the receiver-recovered FIG. 8 channel signals S[0.1] and Q[0.15]. The SI[0] and SI[1] signals signify whether a DBI operation has been performed on the first data channel and second data channel, respectively, for the current bit time. In response, inverse invert logic block 1201 performs inverse DBI operations as necessary to recover the non-inverted data.

Each inverse invert block 1202 receives the invert SI[0.1], an upper data sub-channel Q[i], and a corresponding lower data sub-channel Q[i+8]. Inverse invert block 602 performs inverse inversion based on SI[0] for Q[0.7] and based on SI[1] for Q[8.15]. A first XOR gate 1203 performs data inversion on Q[i] when SI[0] is asserted, and a second XOR gate 1204 performs data inversion on Q[i+8] when SI[1] is asserted. Two latches, 1206 and 1207, latch the two outputs from gates 1203 and 1204, respectively, at an appropriate instant for the current bit time.

In the foregoing description and in the accompanying drawings, specific terminology and drawing symbols are set forth to provide a thorough understanding of the concepts described herein. In some instances, the terminology and symbols may imply specific details that are acceptable, but not necessary. For example, circuits described or depicted as including metal oxide semiconductor (MOS) transistors may alternatively be implemented using bipolar technology or any other technology in which a signal-controlled current flow may be achieved.

A process for conditionally or selectively performing DBI/inversion and data swap operations to maintain or correct an intermediate voltage in accordance with embodiments described herein can be implemented as, e.g., code in software, hardware, or a combination thereof. For example, when implemented in a computer-readable medium, the computer-readable medium may be encoded with data structures or other information describing circuitry that may be physically instantiated as an integrated circuit or portion of an integrated circuit. Although various formats may be used for such encoding, these data structures are commonly written in Caltech Intermediate Format (CIF), Calma GDS II Stream Format (GDSII), or Electronic Design Interchange Format (EDIF). Those of skill in the art of integrated circuit design can develop such data structures from schematic diagrams of the type detailed above and the corresponding descriptions and encode the data structures on computer readable medium. Those of skill in the art of integrated circuit fabrication can use such encoded data to fabricate integrated circuits comprising one or more of the circuits described herein. In any event, the logic described above can be implemented in hardware, software, or a combination thereof.

While specific embodiments have been described, certain variations flow from those specific embodiments. For example, any unidirectional, point-to-point, or chip-to-chip embodiments described herein are easily extensible to bidirectional systems, multi-drop buses, and to communication within and between larger or smaller systems. Furthermore, the advantages provided by the circuitry, logic, and hardware depicted above can be extended to other types of signals. For example, continuous-time clock signals conveyed in parallel on an integrated circuit can suffer from SSN and may benefit from the solutions provided herein. In still other embodiments the transmitted signals can be multi-pulse-amplitude-modulated (multi-PAM) signals.

Moreover, some components are shown directly connected to one another while others are shown connected via intermediate components. In each instance the method of interconnection, or "coupling," establishes some desired electrical communication between two or more circuit nodes, or terminals. Such coupling may often be accomplished using a number of circuit configurations, as will be understood by those of skill in the art. Therefore, the spirit and scope of the appended claims should not be limited to the foregoing description.

What is claimed is:

1. A method for maintaining a supply voltage in a stacked communication transmitter comprising one or more first transmitters and one or more second transmitters, the first transmitters corresponding to a first transmit channel and coupled between a first supply voltage and a second supply voltage, the second transmitters corresponding to a second transmit channel and coupled between the second supply voltage and a third supply voltage, said method comprising:
- determining whether a the second supply voltage meets a supply voltage adjustment condition; and
- responsive to whether the supply voltage adjustment condition is met, selecting one of a plurality of possible bit transition codings for to-be-transmitted data on at least one of said first transmit channel and said second transmit channel to adjust the second supply voltage.

2. The method of claim 1 wherein said selecting comprises controlling the number of bit transitions occurring between a first bit time and a second bit time on at least one of said first and second channels.

3. The method of claim 1 wherein said selecting comprises creating a disparate number of bit transitions on said first channel and said second channel between a first bit time and a second bit time.

4. The method of claim 1 wherein said selecting comprises creating a supply current imbalance between said first channel and said second channel.

5. The method of claim 2 wherein said selecting comprises selectively inverting one or more bit values during said second bit time on at least one of said first and second channels, where not inverting the one or more bit values would result in a reduction in transmit power.

6. The method of claim 2 wherein said selecting comprises selectively not inverting one or more bit values during said second bit time on at least one of said first and second channels, where inverting the one or more bit values would result in a reduction in transmit power.

7. The method of claim 2 wherein said selecting comprises selectively swapping data on said first channel with data on said second channel during said second bit time.

8. The method of claim 2 wherein said selecting comprises selectively not swapping data on said first channel with data on said second channel during said second bit time.

9. The method of claim 1 wherein said selecting comprises overriding a data channel inversion operation.

10. The method of claim 1 wherein said determining whether a supply voltage adjustment condition is met comprises comparing the second supply voltage to a threshold that partially defines a target range.

11. The method of claim 1, further comprising, when a supply voltage adjustment condition is not met, selecting one of the plurality of possible bit transition codings that minimizes the number of bit transitions on said first and second channels.

12. The method of claim 11 wherein minimizing the number of bit transitions on said first and second channels comprises:
considering a first division of the to-be-transmitted data for possible transmission on the first transmit channel as inverted and as non-inverted data, and for possible transmission on the second transmit channel as inverted and as non-inverted data;
considering a second division of the to-be-transmitted data for possible transmission on the first transmit channel as inverted and as non-inverted data, and for possible transmission on the second transmit channel as inverted and as non-inverted data; and
selecting a combination of the transmission possibilities that transmits both the first division and second division in parallel, and that minimizes the number of bit transitions on both the first transmit channel and the second transmit channel.

13. The method of claim 1, wherein the criteria for selecting one of said plurality of possible bit transition codings is based at least in part on the relative magnitude of said supply voltage adjustment.

14. The method of claim 1 wherein said supply voltage adjustment is performed according to criteria that will effect said supply voltage adjustment in a direction that corrects the condition.

15. A multi-channel transmitter, said multi-channel transmitter comprising:
one or more first transmitters corresponding to a first transmit channel and coupled between a first supply voltage and a second supply voltage;
one or more second transmitters corresponding to a second transmit channel and coupled between the second supply voltage and a third supply voltage;
logic for determining whether the second supply voltage meets a supply voltage adjustment condition; and
logic for selecting, responsive to whether the supply voltage adjustment condition is met, one of a plurality of possible bit transition codings for to-be-transmitted data on at least one of said first transmit channel and said second transmit channel to adjust said second supply voltage.

16. The transmitter of claim 15 further comprising logic for controlling the number of bit transitions occurring between a first bit time and a second bit time on at least one of said first and second channels.

17. The transmitter of claim 15 further comprising logic for creating a disparate number of bit transitions on said first channel and said second channel between a first bit time and a second bit time.

18. The transmitter of claim 15 further comprising logic for creating a supply current imbalance between said first channel and said second channel.

19. The transmitter of claim 16 further comprising logic for selectively inverting one or more bit values during said second bit time on at least one of said first and second channels, where not inverting the one or more bit values would result in a reduction in transmit power.

20. The transmitter of claim 16 further comprising logic for selectively not inverting one or more bit values during said second bit time on at least one of said first and second channels, where inverting the one or more bit values would result in a reduction in transmit power.

21. The transmitter of claim 16 further comprising logic for selectively swapping data on said first channel with data on said second channel during said second bit time.

22. The transmitter of claim 16 further comprising logic for selectively not swapping data on said first channel with data on said second channel during said second bit time.

23. The transmitter of claim 15 further comprising logic for overriding a data channel inversion operation.

24. The transmitter of claim 15 further comprising logic for comparing the second supply voltage to a threshold that partially defines a target range.

25. The transmitter of claim 15 further comprising logic for selecting one of the plurality of possible bit transition codings that minimizes the number of bit transitions on said first and second channels when a supply voltage adjustment condition is not met.

26. A non-transitory computer-readable medium having stored thereon instructions for a multi-channel transmitter comprising one or more first transmitters and one or more second transmitters, the first transmitters corresponding to a first transmit channel and coupled between a first supply voltage and a second supply voltage, the second transmitters corresponding to a second transmit channel and coupled between the second supply voltage and a third supply voltage, the instructions when executed, direct the multi-channel transmitter to:
determine whether the second supply voltage meets a supply voltage adjustment condition; and
responsive to whether the supply voltage adjustment condition is met, select one of a plurality of possible bit transition codings for to-be-transmitted data on at least one of said first transmit channel and said second transmit channel to adjust said supply voltage.

27. The non-transitory computer-readable medium of claim 26 having stored thereon instructions that, when executed, further direct the multi-channel transmitter to control the number of bit transitions occurring between a first bit time and a second bit time on at least one of said first and second channels.

28. The non-transitory computer-readable medium of claim 26 having stored thereon instructions that, when executed, further direct the multi-channel transmitter to create a disparate number of bit transitions on said first channel and said second channel between a first bit time and a second bit time.

29. The non-transitory computer-readable medium of claim 26 having stored thereon instructions that, when executed, further direct the multi-channel transmitter to create a supply current imbalance between said first channel and said second channel.

30. The non-transitory computer-readable medium of claim 27 having stored thereon instructions that, when executed, further direct the multi-channel transmitter to selectively invert one or more bit values during said second bit time on at least one of said first and second channels, where not inverting the one or more bit values would result in a reduction in transmit power.

31. The non-transitory computer-readable medium of claim 27 having stored thereon instructions that, when executed, further direct the multi-channel transmitter to selectively not invert one or more bit values during said second bit time on at least one of said first and second channels, where inverting the one or more bit values would result in a reduction in transmit power.

32. The non-transitory computer-readable medium of claim 27 having stored thereon instructions that, when executed, further direct the multi-channel transmitter to selectively swap data on said first channel with data on said second channel during said second bit time.

33. The non-transitory computer-readable medium of claim 27 having stored thereon instructions that, when executed, further direct the multi-channel transmitter to selectively not swap data on said first channel with data on said second channel during said second bit time.

34. The non-transitory computer-readable medium of claim 26 having stored thereon instructions that, when executed, further direct the multi-channel transmitter to override a data channel inversion operation.

35. The non-transitory computer-readable medium of claim 26 having stored thereon instructions that, when executed, further direct the multi-channel transmitter to compare said second supply voltage to a threshold that partially defines a target range.

36. The non-transitory computer-readable medium of claim 26 having stored thereon instructions that, when executed, further direct the multi-channel transmitter to select one of the plurality of possible bit transition codings that minimizes the number of bit transitions on said first and second channels when a supply voltage adjustment condition is not met.

37. The non-transitory computer-readable medium of claim 26 having stored thereon instructions that, when executed, further direct the multi-channel transmitter to select one of said plurality of possible bit transition codings based at least in part on the relative magnitude of said supply voltage adjustment.

38. The non-transitory computer-readable medium of claim 26 having stored thereon instructions that, when executed, further direct the multi-channel transmitter to adjust said second supply voltage according to criteria that will effect said supply voltage adjustment in a direction that corrects the condition.

39. A multi-channel receiver, said receiver comprising:
first receive circuitry corresponding to a first channel;
second receive circuitry corresponding to a second channel;
logic for determining whether bits received on at least one of the first channel and the second channel were previously inverted;
logic for performing an inverse invert operation on bits determined to have been previously inverted;
logic for determining whether bits received on said first channel were previously swapped with bits received on said second channel; and
logic for performing an inverse swap operation responsive to determining that the bits received on said first channel were previously swapped with bits received on said second channel, the logic performing the inverse swap operation by switching routing of the bits received on said first channel from a first output channel to a second output channel and switching routing of the bits received on said second channel from the second output channel to the first output channel.

* * * * *